United States Patent [19]

Takanashi et al.

[11] Patent Number: 5,463,468
[45] Date of Patent: Oct. 31, 1995

[54] DISPLAY UNIT HAVING A LIGHT-TO-LIGHT CONVERSION ELEMENT

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokohama, Japan

[21] Appl. No.: 216,232

[22] Filed: Mar. 16, 1994

Related U.S. Application Data

[63] Continuation of Ser. No. 702,817, May 21, 1991, abandoned.

[30] Foreign Application Priority Data

| May 21, 1990 | [JP] | Japan | 2-130498 |
| May 23, 1990 | [JP] | Japan | 2-134928 |
| Jul. 20, 1990 | [JP] | Japan | 2-192358 |

[51] Int. Cl.$^6$ ................................. H04N 1/23
[52] U.S. Cl. ................ 358/296; 359/66; 348/195
[58] Field of Search ................... 358/296, 56, 57, 358/59, 60, 61, 62, 63; 359/40, 66, 72; 348/195

[56] References Cited

U.S. PATENT DOCUMENTS

| 2,163,540 | 6/1939 | Clothier et al. | 178/5.2 |
| 3,760,096 | 9/1973 | Roth | 358/63 |
| 4,521,771 | 6/1985 | Alton | 340/705 |
| 4,623,219 | 11/1986 | Trias | 350/351 |
| 4,654,716 | 3/1987 | Zimmerman | 358/63 X |
| 4,688,911 | 8/1987 | Simbal |  |
| 4,838,652 | 6/1989 | Inaba et al. | 346/160 X |
| 5,124,545 | 6/1992 | Takanashi et al. | 359/72 |
| 5,132,814 | 7/1992 | Ohkouchie et al. | 357/72 X |

FOREIGN PATENT DOCUMENTS

| 0168164 | 1/1986 | European Pat. Off. | G09G 3/02 |
| 0301801 | 2/1989 | European Pat. Off. | H04N 3/08 |
| 0362776 | 4/1990 | European Pat. Off. | G09F 9/35 |
| 2142203 | 1/1985 | United Kingdom | H04N 5/74 |
| 9005429 | 5/1990 | WIPO | H04N 9/31 |

OTHER PUBLICATIONS

"Full-Color Single-Projection-Lens Liquid-Crystal Light-Valve Projector" by Arno G. Ledebuhr; SID 36 Digest pp. 379-382.

"Real-Time Graphics and Alphanumeric Displays for Any Large Meeting—Anywhere"; Hughes Model 800; Computer Grahpics Projector.

T. D. Beard et al. "AC Liquid-Crystal Light Valve", Appl. Phys. Lett., vol. 22, No. 3 (Feb. 1971, pp. 90-92.

*Primary Examiner*—Peter S. Wong
*Assistant Examiner*—Eric Frahm
*Attorney, Agent, or Firm*—Lowe, Price, LeBlanc & Becker

[57] ABSTRACT

A display unit includes a light-emitting element array having a plurality of linearly arranged light-emitting elements drivable by a time sequential image information signal to emit beams of light in accordance with pieces of information allotted to the corresponding picture elements, a deflector such as a polygon mirror for deflecting the light beams simultaneously in a direction perpendicular to the longitudinal direction of the light-emitting element array, and a light-to-light conversion element including a photoconductive layer and a photo-modulation layer, the light beams being imaged on the photoconductive layer.

7 Claims, 27 Drawing Sheets

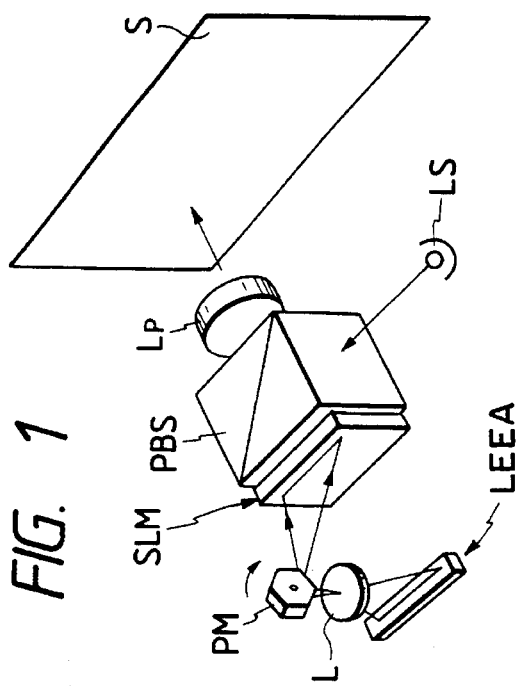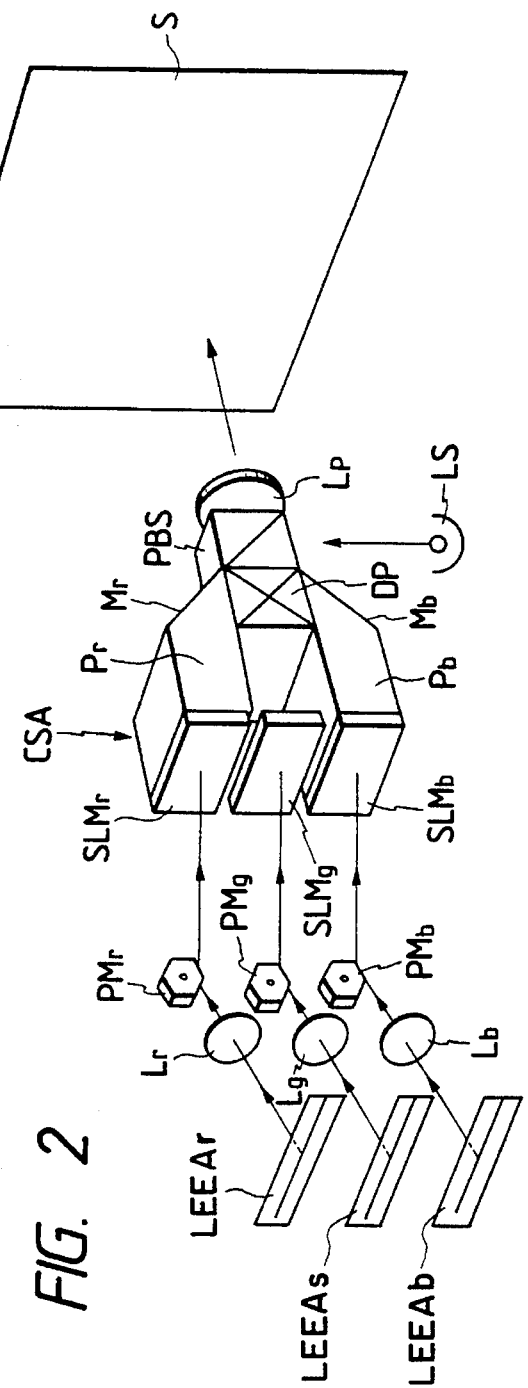

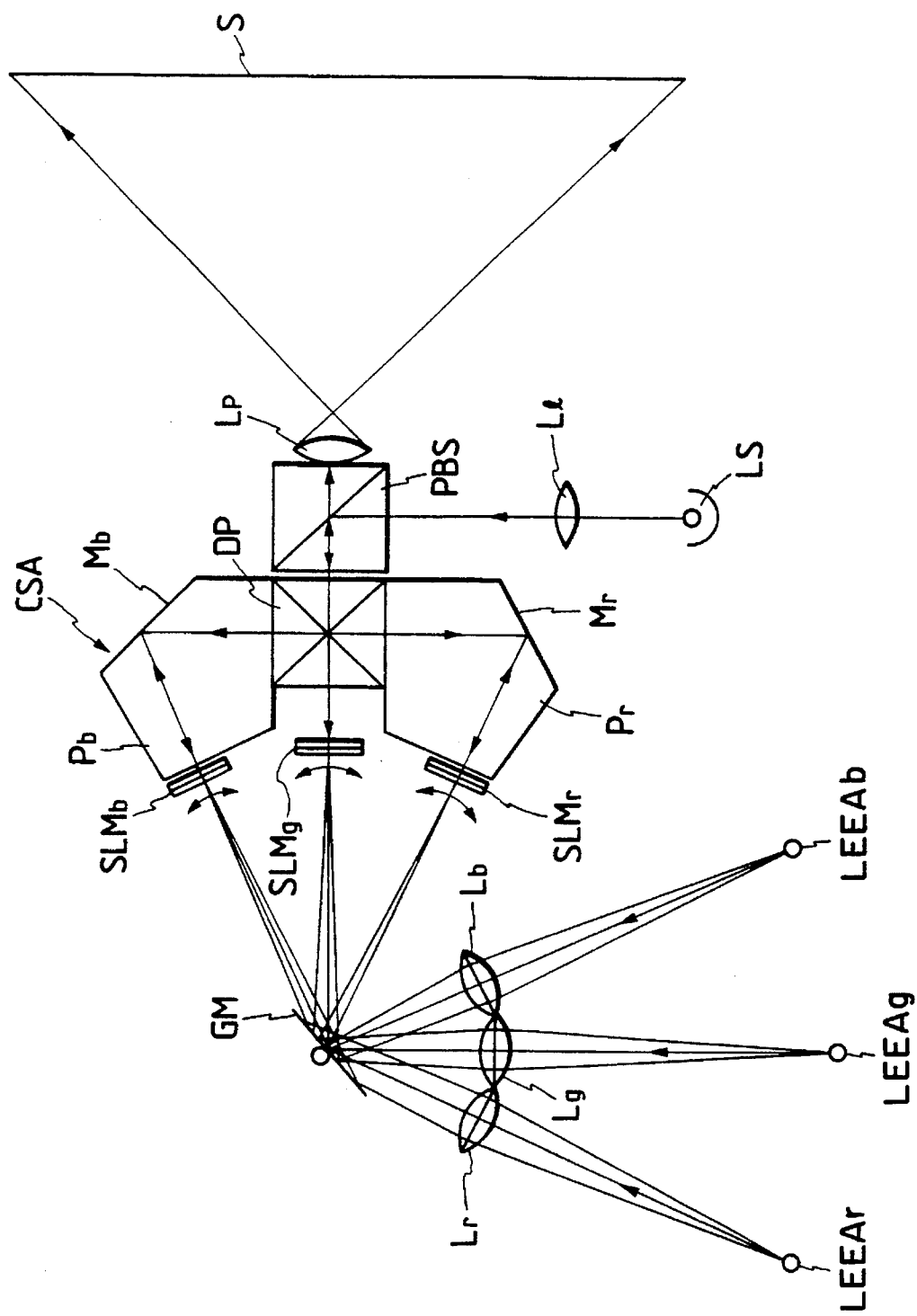

| 11 | 12 | 13 | ------- | 1(n-2) | 1(n-1) | 1n |
|----|----|----|---------|--------|--------|-----|
| 21 | 22 | 23 | ------- | 2(n-2) | 2(n-1) | 2n |
| 31 | 32 | 33 | ------- | 3(n-2) | 3(n-1) | 3n |
| | | | | | | |
| m1 | m2 | m3 | ------- | m(n-2) | m(n-1) | mn |

FIG. 10(a)

| ROW₁ → | $S_{11}$ | $S_{12}$ | $S_{13}$ | -------- | $S_{1(n-2)}$ | $S_{1(n-1)}$ | $S_{1n}$ |
|---|---|---|---|---|---|---|---|
| ROW₂ → | $S_{21}$ | $S_{22}$ | $S_{23}$ | -------- | $S_{2(n-2)}$ | $S_{2(n-1)}$ | $S_{2n}$ |
| ROW₃ → | $S_{31}$ | $S_{32}$ | $S_{33}$ | -------- | $S_{3(n-2)}$ | $S_{3(n-1)}$ | $S_{3n}$ |

LEEA(P)
[P: PLURALITY]

FIG. 10(b)

| ROW₁ → | $S_{21}$ | $S_{22}$ | $S_{23}$ | -------- | $S_{2(n-2)}$ | $S_{2(n-1)}$ | $S_{2n}$ |
|---|---|---|---|---|---|---|---|
| ROW₂ → | $S_{31}$ | $S_{32}$ | $S_{33}$ | -------- | $S_{3(n-2)}$ | $S_{3(n-1)}$ | $S_{3n}$ |
| ROW₃ → | $S_{41}$ | $S_{42}$ | $S_{43}$ | -------- | $S_{4(n-2)}$ | $S_{4(n-1)}$ | $S_{4n}$ |

LEEA(P)
[P: PLURALITY]

FIG. 10(c)

| ROW₁ → | $S_{31}$ | $S_{32}$ | $S_{33}$ | -------- | $S_{3(n-2)}$ | $S_{3(n-1)}$ | $S_{3n}$ |
|---|---|---|---|---|---|---|---|
| ROW₂ → | $S_{41}$ | $S_{42}$ | $S_{43}$ | -------- | $S_{4(n-2)}$ | $S_{4(n-1)}$ | $S_{4n}$ |
| ROW₃ → | $S_{51}$ | $S_{52}$ | $S_{53}$ | -------- | $S_{5(n-2)}$ | $S_{5(n-1)}$ | $S_{5n}$ |

LEEA(P)
[P: PLURALITY]

FIG. 11(a)

| | | | | | | |
|---|---|---|---|---|---|---|
| 11 $I_{S11}$ | 12 $I_{S12}$ | 13 $I_{S13}$ | | | | |
| 21 $I_{S21}$ | 22 $I_{S22}$ | 23 $I_{S23}$ | | | | |
| 31 $I_{S31}$ | 32 $I_{S32}$ | 33 $I_{S33}$ | | | | |
| 41 | 42 | 43 | | | | |
| 51 | 52 | 53 | | | | |
| 61 | 62 | 63 | | | | |
| 71 | 72 | 73 | | | | |

↑ ROW₁  ↑ ROW₂  ↑ ROW₃

FIG. 11(b)

| | | | | | | |
|---|---|---|---|---|---|---|
| 11 | 12 | 13 | | | | |
| 21 $I_{S21}$ | 22 $I_{S22}$ | 23 $I_{S23}$ | | | | |
| 31 $I_{S31}$ | 32 $I_{S32}$ | 33 $I_{S33}$ | | | | |
| 41 $I_{S41}$ | 42 $I_{S42}$ | 43 $I_{S43}$ | | | | |
| 51 | 52 | 53 | | | | |
| 61 | 62 | 63 | | | | |
| 71 | 72 | 73 | | | | |

↑ ROW₁  ↑ ROW₂  ↑ ROW₃

FIG. 11(c)

| | | | | | | |
|---|---|---|---|---|---|---|
| 11 | 12 | 13 | | | | |
| 21 | 22 | 23 | | | | |
| 31 $I_{S31}$ | 32 $I_{S32}$ | 33 $I_{S33}$ | | | | |
| 41 $I_{S41}$ | 42 $I_{S42}$ | 43 $I_{S43}$ | | | | |
| 51 $I_{S51}$ | 52 $I_{S52}$ | 53 $I_{S53}$ | | | | |
| 61 | 62 | 63 | | | | |
| 71 | 72 | 73 | | | | |

↑ ROW₁  ↑ ROW₂  ↑ ROW₃

FIG. 11(f)

| 11 | 12 | 13 |
|---|---|---|
| 21 | 22 | 23 |
| 31 | 32 | 33 |
| 41 | 42 | 43 |
| 51 | 52 | 53 |
| 61 IS61 | 62 IS62 | 63 IS63 | ← ROW₁
| 71 IS71 | 72 IS72 | 73 IS73 | ← ROW₂
| 81 IS81 | 82 IS82 | 83 IS83 | ← ROW₃

FIG. 11(e)

| 11 | 12 | 13 |
|---|---|---|
| 21 | 22 | 23 |
| 31 | 32 | 33 |
| 41 | 42 | 43 |
| 51 IS51 | 52 IS52 | 53 IS53 | ← ROW₁
| 61 IS61 | 62 IS62 | 63 IS63 | ← ROW₂
| 71 IS71 | 72 IS72 | 73 IS73 | ← ROW₃

FIG. 11(d)

| 11 | 12 | 13 |
|---|---|---|
| 21 | 22 | 23 |
| 31 | 32 | 33 |
| 41 IS41 | 42 IS42 | 43 IS43 | ← ROW₁
| 51 IS51 | 52 IS52 | 53 IS53 | ← ROW₂
| 61 IS61 | 62 IS62 | 63 IS63 | ← ROW₃
| 71 | 72 | 73 |

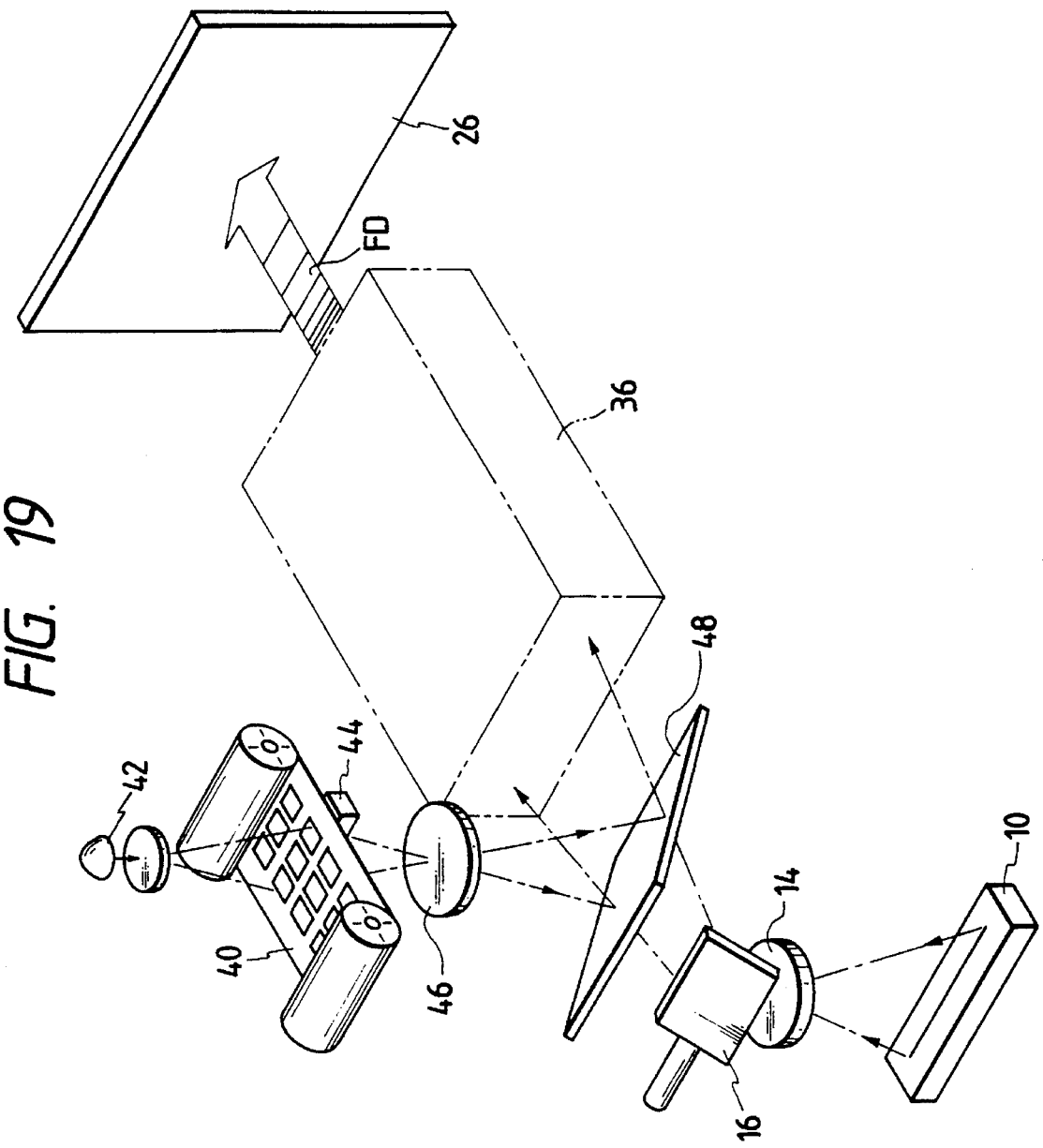

[X-DIRECTION POSITION ADJUSTMENT]

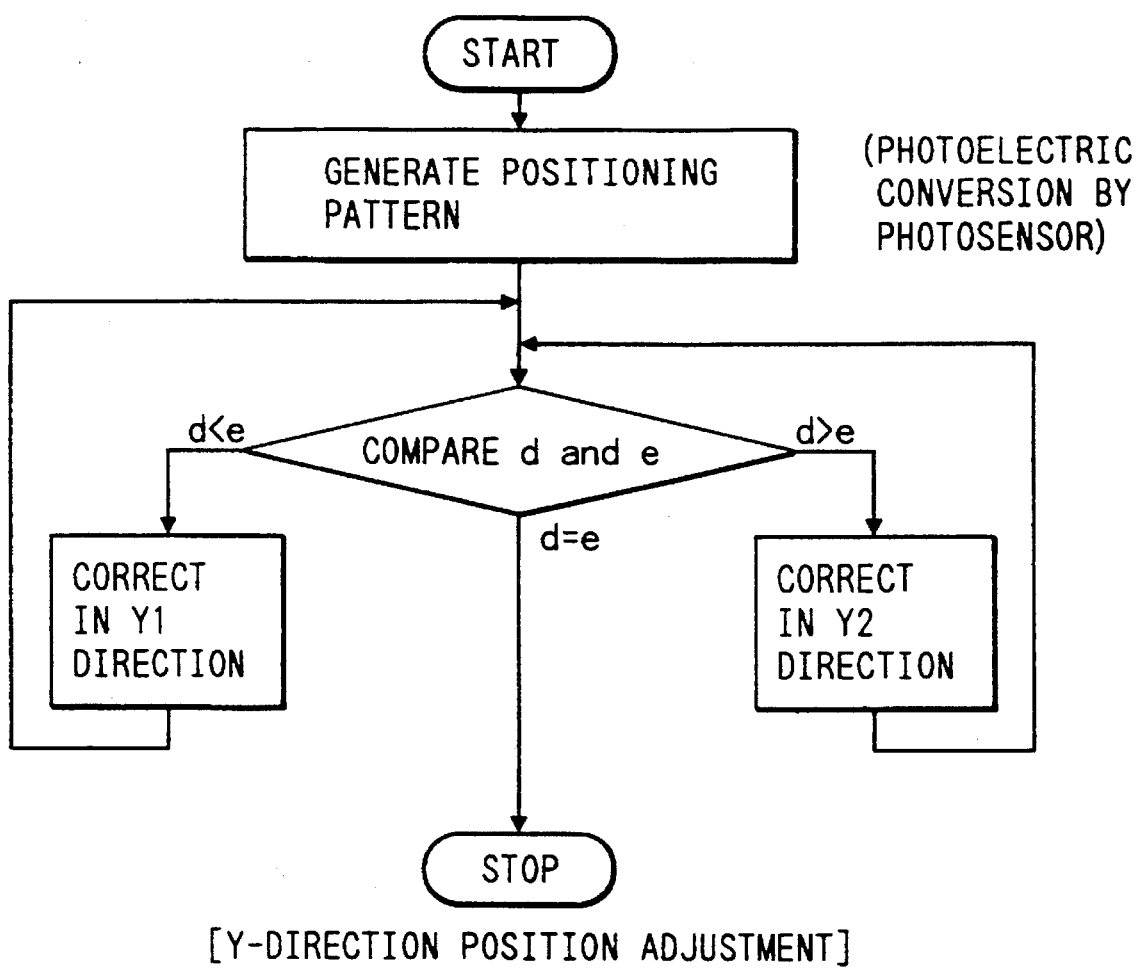

DISPLAY UNIT HAVING A LIGHT-TO-LIGHT CONVERSION ELEMENT

This application is a continuation of application Ser. No. 07/702,817 filed May 21, 1991 now abandoned.

BACKGROUND OF THE INVENTION

1. Field of the Invention

The present invention relates to a high resolution display unit using a light-to-light conversion element and particularly suitable for use with optical computers.

2. Description of the Related Art

Various display units are known in which a light beam intensity-modified by a time sequential information signal is projected by a projecting optical system onto a screen to display a two-dimensional image.

In the prior display units, a light signal which is intensity-modified by each individual picture element information contained in an image signal is scanned in horizontal and vertical directions. With this arrangement, if a high intensity and high resolution optical two-dimensional image, such as a high definition two-dimensional image composed of 4000×4000 picture elements or pixels arranged in rows and columns should be formed nearly in real time by using a time sequential signal, the prior display units are unable to meet this request due to the absence of a suitable signal conversion element.

With the foregoing difficulty in view, the present assignee has proposed an improved display unit in which a cross-sectionally linear beam of light emitted from a light source is projected onto a photo-modulator including numeral reflective members each provided for one picture element and displaceable in accordance with a piece of picture element information. The light beam incident to the photo-modulator is intensity-modified with respect to picture elements arranged in a longitudinal direction of the linear cross-sectional shape of the light beam and then projected from the photo-modulator in the form of a cross-sectionally linear, intensity-modified beam of light. The intensity-modified light beam then impinges upon a rotating polygon mirror and is deflected by the latter in a horizontal direction at a predetermined cycle. Subsequently, the deflected light beam is projected by a projection lens onto a screen, thereby forming a two-dimensional image on the screen (see Japanese Patent Application No. 1-337171 corresponding to co-pending U.S. patent application Ser. No. 63,223, filed Dec. 24, 1990).

The improved display unit is satisfactory in solving the problem associated with the prior display units described above and is able to realize a high intensity, high definition image display with utmost ease, however, it still has a problem that the action of intensity-modulation of light performed by the photo-modulator is relatively slow.

SUMMARY OF THE INVENTION

With the foregoing drawbacks of the prior art in view, it is an object of the present invention to provide a display unit which is capable of displaying an image at high intensity with high resolution without involving the problem arising from a slow light intensity modulation of the photo-modulator.

Another object of the present invention is to provide a display unit for processing an optical image which is based on a time sequential signal and an optical image produced from an information recording medium.

A further object of this invention is to provide a display unit which is compact in size, and can be manufactured easily at a low cost and is capable of displaying a color image without involving the problem of registration error.

According to a first aspect of this invention, there is provided a display unit which comprises: a light-emitting element array composed of a plurality of linearly arranged light-emitting elements each corresponding to one of a same number of picture elements, the light-emitting elements being drivable to emit beams of light in accordance with pieces of information allotted to the corresponding picture elements; means for deflecting the light beams emitted from the light-emitting elements, simultaneously in a direction perpendicular to a longitudinal direction of the light-emitting element array; and a light-to-light conversion element including two electrodes of opposite polarities and a photoconductive layer and a photo-modulation layer disposed between the electrodes, the photoconductive layer being capable of forming an image when scanned with the deflected light beams.

According to a preferred embodiment, the display unit further includes a zoom lens capable of continuously varying the magnification of the image formed in the photoconductive layer. The light-emitting element array may further include a microlens array overlying the linearly arranged light-emitting elements.

According to a second aspect of this invention, there is provided a display unit which comprises: a plurality of light-emitting element arrays, each array being composed of a plurality of linearly arranged light-emitting elements each corresponding to one of same number of picture elements, the light-emitting element arrays being disposed side by side with their light-emitting elements laterally aligned with each other; means for driving the light-emitting elements of each of the light-emitting element arrays to emit beams of light simultaneously for a predetermined period of time in accordance with one of different rows of pieces of picture element information allotted to the corresponding picture elements; means for deflecting the light beams emitted from each of the light-emitting element arrays, simultaneously in a direction perpendicular to a longitudinal direction of the light-emitting element arrays; means for supplying the different rows of pieces of picture element information to the light-emitting element arrays while shifting the rows of pieces of picture element information successively in a direction opposite to the direction of movement of the light beams caused by deflection by the deflecting means, in synchronism with the deflection by the deflecting means and at intervals of the predetermined period of time; a light-to-light conversion element including two electrodes of opposite polarities and a photoconductive layer and a photo-modulation layer disposed between the electrodes, the photoconductive layer being capable of forming an image when scanned with the deflected light beams; and means for imaging the deflected light beams onto the photoconductive layer of the light-to-light conversion element.

According to a third aspect of this invention, there is provided a display unit which comprises: three parallel spaced light-emitting element arrays provided for three primary colors, each array being composed of a plurality of linearly arranged light-emitting elements corresponding to a same number of picture elements; means for driving the light-emitting elements of each of the light-emitting element arrays to emit beams of light simultaneously for a predetermined period of time in accordance with a corresponding one of three different rows of pieces of picture element information; a first polygon mirror for deflecting the light beams emitted from a first one of the light-emitting element arrays, simultaneously in a direction perpendicular to a longitudinal direction of the light-emitting element arrays; a second polygon mirror for deflecting the light beams emitted from a second one of the light-emitting element arrays, simultaneously in a direction perpendicular to a longitudinal direction of the light-emitting element arrays; a third polygon mirror for deflecting the light beams emitted from a third one of the light-emitting element arrays, simultaneously in a direction perpendicular to a longitudinal direction of the light-emitting element arrays; a first light-to-light conversion element including two electrodes of opposite polarities and a photoconductive layer and a photo-modulation layer disposed between the electrodes, the photoconductive layer being capable of forming an image when scanned with the deflected light beams from the first light-emitting element array; a second light-to-light conversion element including two electrodes of opposite polarities and a photoconductive layer and a photo-modulation layer disposed between the electrodes, the photoconductive layer being capable of forming an image when scanned with the deflected light beams from the second light-emitting element array; a third light-to-light conversion element including two electrodes of opposite polarities and a photoconductive layer and a photo-modulation layer disposed between the electrodes, the photoconductive layer being capable of forming an image when scanned with the deflected light beams from the third light-emitting element array; a first lens for imaging the light beams from the first light-emitting element array via the first polygon mirror onto the photoconductive layer of the first light-to-light conversion element; a second lens for imaging the light beams from the second light-emitting element array via the second polygon mirror onto the photoconductive layer of the second light-to-light conversion element; a third lens for imaging the light beams from the third light-emitting element array via the third polygon mirror onto the photoconductive layer of the third light-to-light conversion element; and a three color separation and composition optical system associated with the first, second and third light-to-light conversion elements for combining colors of the respective images formed in the first, second and third light-to-light conversion elements and reproducing them as a composite color image.

According to a fourth aspect of this invention, there is provided a display unit which comprises: three parallel spaced light-emitting element arrays provided for three primary colors, each array being composed of a plurality of linearly arranged light-emitting elements corresponding to a same number of picture elements; means for driving the light-emitting elements of each of the light-emitting element arrays to emit beams of light simultaneously for a predetermined period of time in accordance with a corresponding one of three different rows of pieces of picture element information; means for deflecting the light beams emitted from the light-emitting element arrays, simultaneously in a direction perpendicular to a longitudinal direction of the light-emitting element arrays; a first light-to-light conversion element including two electrodes of opposite polarities and a photoconductive layer and a photo-modulation layer disposed between the electrodes, the photoconductive layer being capable of forming an image when scanned with the deflected light beams from a first one of the light-emitting element arrays; a second light-to-light conversion element including two electrodes of opposite polarities and a photoconductive layer and a photo-modulation layer disposed between the electrodes, the photoconductive layer being capable of forming an image when scanned with the deflected light beams from a second one of the light-emitting element arrays; a third light-to-light conversion element including two electrodes of opposite polarities and a photoconductive layer and a photo-modulation layer disposed between the electrodes, the photoconductive layer being capable of forming an image when scanned with the deflected light beams from a third one of the light-emitting element arrays; a first lens for imaging the light beams from the first light-emitting element array via the deflecting means onto the photoconductive layer of the first light-to-light conversion element; a second lens for imaging the light beams from the second light-emitting element array via the deflecting means onto the photoconductive layer of the second light-to-light conversion element; a third lens for imaging the light beams from the third light-emitting element array via the deflecting means onto the photoconductive layer of the third light-to-light conversion element; and a three color separation and composition optical system associated with the first, second and third light-to-light conversion elements for combining colors of the respective images formed in the first, second and third light-to-light conversion elements and reproducing them as a composite color image. In case where the first, second and third light-emitting element arrays, the first, second and third light-to-light conversion elements, and the first, second and third lenses are disposed in separate flat planes, the display unit further may include means for equalizing the length of optical paths between the first, second and third light-emitting element arrays and the photoconductive layers of the corresponding light-to-light conversion elements.

According to a fifth aspect of this invention, there is provided a display unit which comprises: a light-emitting element array composed of longitudinally aligned three groups of light-emitting elements, each group corresponding to one of three rows of picture elements of three primary colors and capable of emitting beams of light of one of three different wavelength regions; means for driving the groups of light-emitting elements of the light-emitting element array to emit three groups of beams of light of different wavelengths, simultaneously for a predetermined period of time in accordance with the corresponding rows of pieces of picture element information; means for deflecting the groups of light beams emitted from the light-emitting element array, simultaneously in a direction perpendicular to a longitudinal direction of the light-emitting element arrays; a first light-to-light conversion element including two electrodes of opposite polarities and a photoconductive layer and a photo-modulation layer disposed between the electrodes, the photoconductive layer being capable of forming an image when scanned with the deflected light beams from a first one of the groups of light-emitting elements; a second light-to-light conversion element including two electrodes of opposite polarities and a photoconductive layer and a photo-modulation layer disposed between the electrodes, the photoconductive layer being capable of forming an image when scanned with the deflected light beams from a second one of the groups of light-emitting elements; a third light-to-light conversion element including two electrodes of opposite polarities and a photoconductive layer and a photo-modulation layer disposed between the electrodes, the photoconductive layer being capable of forming an image when scanned with the deflected light beams from a third one of the groups of light-emitting elements; means for imaging the groups of light beams from the corresponding groups of light-emitting elements via the deflecting means onto the photoconductive layers of corresponding ones of the light-to-light conversion elements; a three color separation and composition optical system associated with the first, second and third light-to-light conversion elements for combining colors of the respective images formed in the first, second and third light-to-light conversion elements and reproducing them as a composite color image.

According to a sixth aspect of this invention, there is provided a display unit which comprises: first means for producing an optical image based on a time sequential signal; second means for producing an optical image based on an information recording medium; at least one light-to-light conversion element for storing the optical images optically written thereto and optically reproducing the stored images; and means for writing at least one of the optical image into the light-to-light conversion element.

According to a seventh aspect of this invention, there is provided a display unit which comprises: a light-emitting element array composed of a plurality of linearly arranged light-emitting elements each corresponding to one of a same number of picture elements; means for driving the light-emitting elements to emit beams of light in accordance with pieces of information allotted to the corresponding picture elements; means for deflecting the light beams emitted from the light-emitting elements, simultaneously in a direction perpendicular to a longitudinal direction of the light-emitting element array; a light-to-light conversion element including at least a photoconductive layer and a photo-modulation layer; a color separation filter disposed on a read-out side of the light-to-light conversion element and having a number of groups of stripe-like filter elements, each group having at least three filter elements of different wavelength ranges corresponding to a desired color separation; and means for controlling the relative position between the light-emitting element array and the light-to-light conversion element so as to image the deflected light beams onto the photoconductive layer in compliance with the desired color separation.

According to an eighth aspect of this invention, there is provided a display unit which comprises: a light-emitting element array composed of a plurality of linearly arranged light-emitting elements each corresponding to one of a same number of picture elements; means for driving the light-emitting elements to emit beams of light in accordance with pieces of information allotted to the corresponding picture elements; means for deflecting the light beams emitted from the light-emitting elements, simultaneously in a direction perpendicular to a longitudinal direction of the light-emitting element array; a light-to-light conversion element including at least a photoconductive layer and a photo-modulation layer, the light-to-light conversion element further including a dielectric mirror layer having a number of stripe-like portions separated into at least three different wavelength regions corresponding to a desired color separation; means for controlling the relative position between the light-emitting element array and the light-to-light conversion element so as to image the deflected light beams onto the photoconductive layer in compliance with the desired color separation; a light source for producing reading light to read out an image from the light-to-light conversion element; and a projection optical system for directing reading light from the light source onto the light-to-light conversion element and projecting reflected light coming from the dielectric mirror layer, onto a screen.

According to a ninth aspect of this invention, there is provided a display unit which comprises: a first color separation filter composed of plural types of first filter elements capable of transmitting beams of light having at least three different wavelength regions; a second color separation filter composed of plural types of second filter elements capable of transmitting beams of light having different wavelength regions, the number of types of second filter elements being the same as that of the first filter element, each type of the second filter elements being paired with a corresponding one of the types of the first filter elements; a light-to-light conversion elements having at least a photoconductive layer and a photo-modulation layer; a light-emitting element array including a plurality of light-emitting elements capable of emitting beams of light of at lest three different wavelength regions corresponding to those of the first color separation filter elements; means for driving the light-emitting elements so as to emit beams of light in accordance with pieces of information allotted to corresponding ones of a plurality of picture elements; means for deflecting the light beams emitted from the respective light-emitting elements in a direction perpendicular to a longitudinal direction of the light-emitting element array; means for imaging the deflected light beams onto the photoconductive layer of the light-to-light conversion element; a light source for producing reading light; and a projection optical system for directing the reading light from the light source to the light-to-light conversion element and projecting beams of modulated light from the photo-modulation layer to a screen to display an image on enlarged scale; the photoconductive layer and the photo-modulation layer being disposed between the first and second color separation filters, with paired groups of first and second filter elements held in confrontation to one another.

The above and other objects, features and advantages of the present invention will become more apparent from the following description when making reference to the detailed description and the accompanying sheets of drawings in which preferred structural embodiments incorporating the principles of the present invention are shown by way of illustrative example.

BRIEF DESCRIPTION OF THE DRAWINGS

FIG. 1 is a diagrammatical perspective view of a display unit according to a first embodiment of this invention;

FIG. 2 is a view similar to FIG. 1 but showing a display unit according to a second embodiment;

FIG. 3 is a view similar to FIG. 1 but showing a display unit according to a third embodiment;

FIG. 8 is a view similar to FIG. 1 but showing a display unit according to a seventh embodiment having a plurality of parallel arranged light-emitting element arrays;

FIGS. 9, 10(*a*) through 10(*c*) and 11(*a*) through 11(*f*) are diagrammatical views illustrative of the construction and operation of the display unit shown in FIG. 8;

FIGS. 17 through 19 are diagrammatical perspective views of three different display units according to ninth, tenth and eleventh embodiments of this invention;

FIGS. 40 and 43 are flowcharts showing the position control operation.

DETAILED DESCRIPTION OF THE PREFERRED EMBODIMENTS

Figure 4:
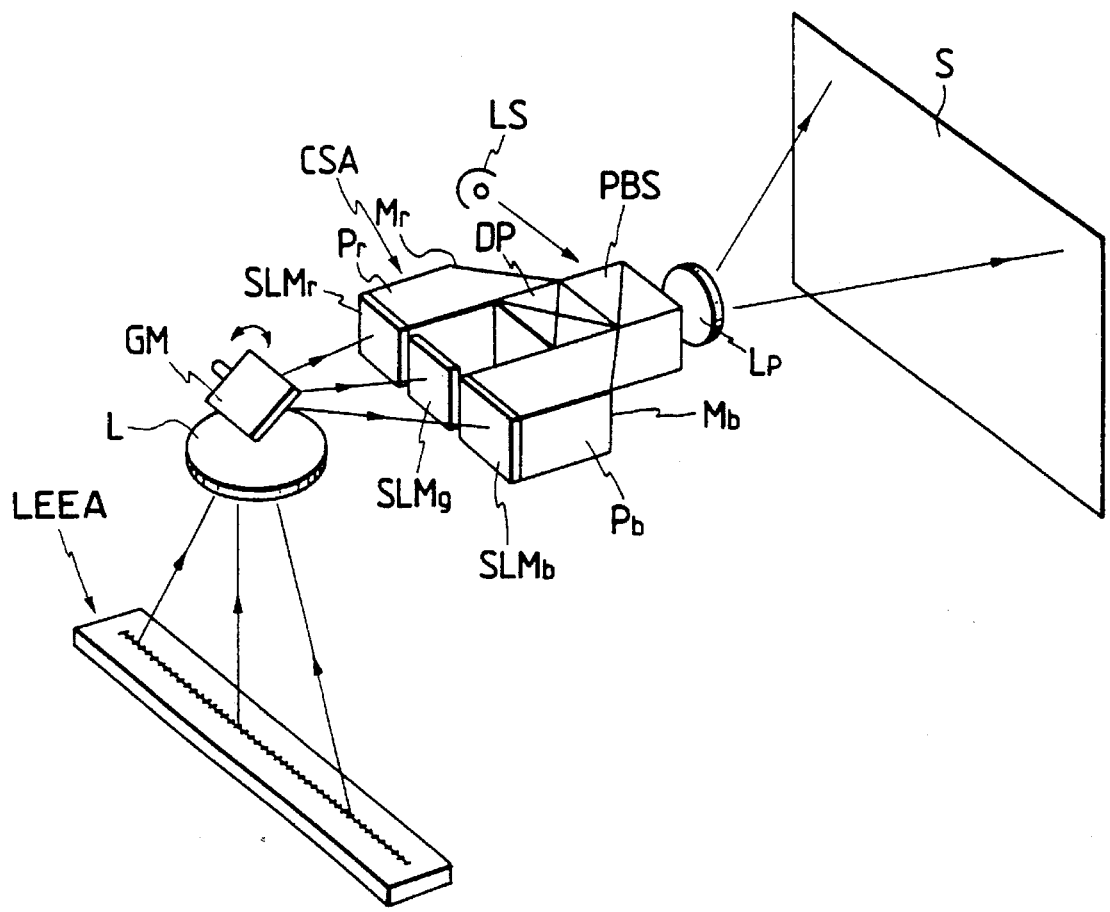
FIG. 4 is a view similar to FIG. 1 but showing a display unit according to a fourth embodiment.

The present invention will be described in greater detail with reference to certain preferred embodiments shown in the accompanying drawings in which like reference characters designate like or corresponding parts throughout the several views. For instance, LEEA designates a light-emitting element array composed of linearly arranged N light-emitting elements corresponding in number to the number of picture elements or pixels where N is a natural number greater than or equal to 2. In the case where a plurality of such light-emitting element arrays LEEA are shown in a same figure, subscripts may be added to a kernel LEEA to distinguish individual light-emitting element arrays.

Figure 13:
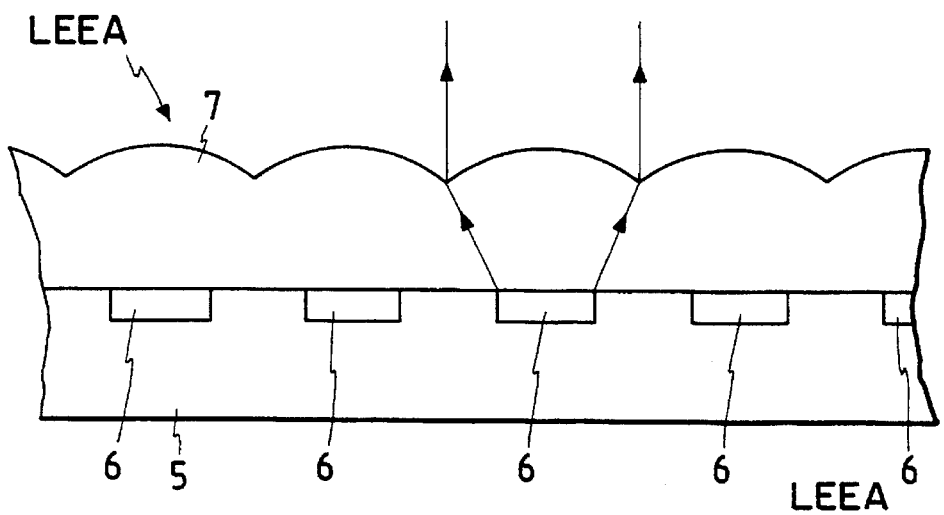
FIG. 13 is a longitudinal cross-sectional view of a portion of a light-emitting element array.
Figure 15:
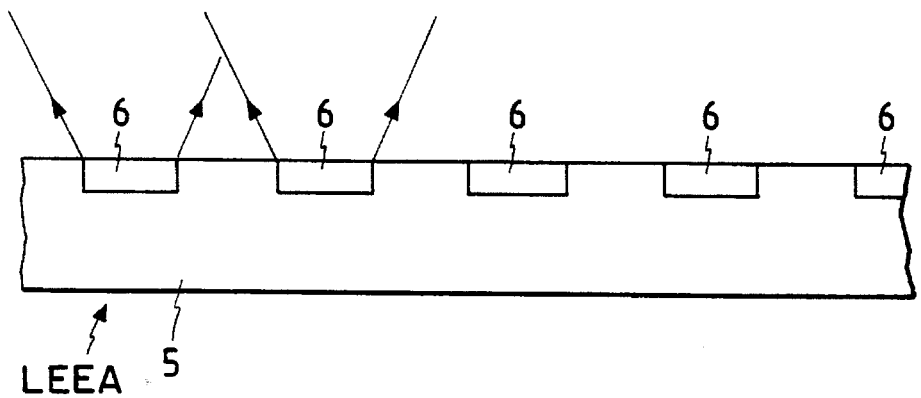
FIG. 15 is a view similar to FIG. 13 but showing another light-emitting element array.

The light-emitting element array LEEA may include, as shown in FIG. 15, a multiplicity of light-emitting elements 6 such as light-emitting diodes, semiconductor lasers, etc. arranged in a straight line or row on a substrate 5. The light-emitting element array LEEA may further include a microlens array 7 superposed on the light-emitting element 6, as shown in FIG. 13. The microlens array 7 thus provided improves the utilization factor of beams of light emitted from the respective light-emitting elements 6, thus making it possible to write image information to a light-to-light conversion element only by a small drive current.

A display unit shown in FIG. 1 includes a light-emitting element array REA having linearly arranged N light-emitting elements which are able to emit beams of light for a predetermined period of time at respective intensities determined in accordance with pieces of information assigned to N picture elements or pixels forming a single straight line of an image to be displayed.

Figure 14:
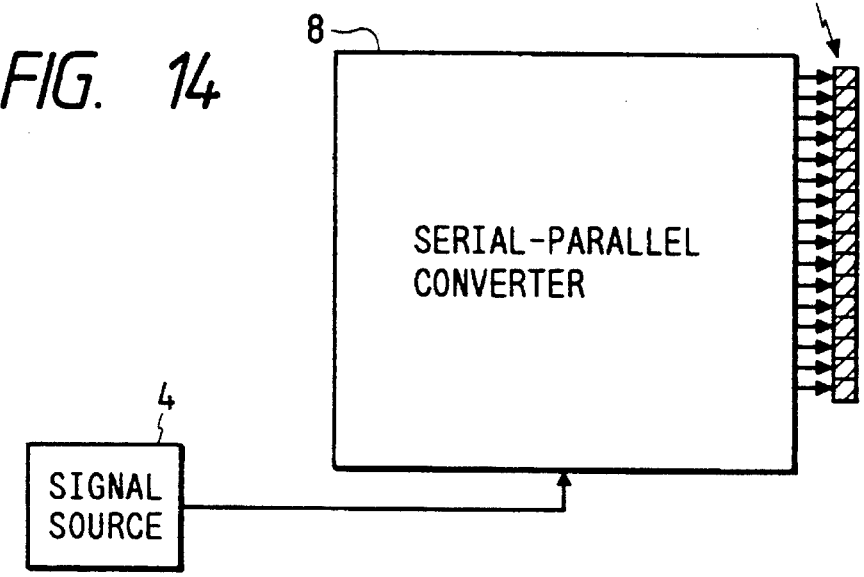
FIG. 14 is a block diagram of a serial-parallel converter.

When image information of a display image is supplied from a signal source to the display unit in the form of a time sequential image signal, as exemplified in FIG. 14, N pieces of picture element information contained in the time sequential image signal are supplied from a signal source 4 and they are converted by a serial-parallel converter 8 into coincidental signals and subsequently supplied to the light-emitting element array LEEA to drive or excite the light-emitting elements. The serial-parallel converter 8 may be a shift register.

The N light-emitting elements of the light-emitting element array LEEA emit N beams of light which are intensity-modified by the N pieces of picture element information. The intensity-modified N mens of light are projected by a imaging lens L onto a polygon mirror PM. Since the polygon mirror PM is rotating at a predetermined speed in the direction of the arrow shown in FIG. 1, the light beams impinging on the polygon mirror PM are projected as writing light onto a photoconductive layer of a light-to-light conversion element (spatial light modulator) SLM to write information about the display image into the light-to-light conversion element SLM. The display image information is read out from the light-to-light conversion element SLM and projected on a screen S when reading light is applied to the light-to-light conversion element.

Figure 16:
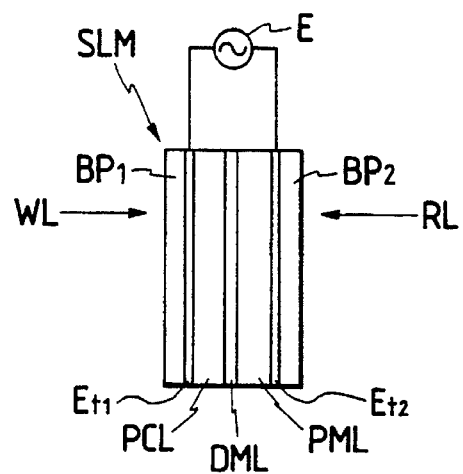
FIG. 16 is a side view of a light-to-light conversion element.

The light-to-light conversion element SLM, as shown in FIG. 16, includes a first transparent substrate BP1, a first transparent electrode Et1, a photoconductive layer PCL, a dielectric mirror DML, a photo-modulation layer PML, a second transparent electrode Et2, and a second transparent substrate BP2 that are laminated together in the order named.

The first and second transparent electrodes Et1, Et2 are thin films of transparent electrically conductive material. The photoconductive layer PCL is made from a material having a photoconductivity in a region of the wavelength of light used. The dielectric mirror DML is a multi-layered film which is capable of reflecting light in a predetermined wavelength band. The photo-modulation layer PML is made from a photo-modulation material such as a nematic liquid crystal, lithium niobate, bismuth silicon oxide (BSO), lead lanthanum zirconate titanate (PLZT), a high polymer-liquid crystal composite film, etc. which is capable of changing various conditions of light (polarization of light, rotary polarization of light an scattering of light) in accordance with the intensity of applied electric field.

A power supply E applies a predetermined voltage across the first and second transparent electrodes Et1, Et1. In FIG. 16, the power supply E is shown as an alternating current power supply. However, a direct current power supply can be used depending on the material of the photo-modulation layer PML.

The writing light WL is projected onto the light-to-light conversion element SLM from the first substrate BP1 side and concentrated into the photoconductive layer PCL. The writing light WL is intensity-modulated in accordance with information to be displayed.

In the display unit shown in FIG. 1, the writing light WL is composed of N beams of light emitted from N light-emitting elements of the light-emitting element array LEEA.

In operation, while the predetermined voltage is supplied from the power supply E across the transparent electrodes Et1, Et2 of the light-to-light conversion element SLM, the N beams of writing light WL which are intensity-modified according to pieces of information to be displayed are projected onto the light-to-light conversion element SLM from the transparent substrate BP1 side thereof. The N beams of writing light WL pass through the transparent substrate BP1 and the transparent electrode Et1 and are converged onto the photoconductive layer PCL whereupon the electric resistance of portions of the photoconductive layer PCL exposed to the beams of writing light changes with the quantity of radiation of writing light. With this change in electric resistance, N electric charge images are formed at a boundary between the photoconductive layer PCL and the dielectric mirror DML. Each of the N electric charge images thus formed is intensity-modified according to the corresponding one of the pieces of information to be displayed and corresponds to the quantity of light irradiated by one of the linearly arranged N beams of writing light WL. The N electric charge images are a pattern of electric charges each having an amount of charge which is equivalent to a corresponding one of successive picture element signals in the time sequential signal.

Due to the formation of the N electric charge images at the boundary between the photoconductive layer PCL and the dielectric mirror DML, there is produced an electric field acting on the photo-modulation layer PML of the light-to-light conversion element SLM.

While keeping this condition, reading light RL is projected from the second transparent substrate BP2 side onto the light-to-light conversion element SLM whereupon the reading light RL passes successively through the transparent substrate BP2, the transparent electrode Et2 and the photo-modulation layer PML and impinges on the dielectric mirror DML. Subsequently, the reading light is reflected by the dielectric mirror DML and moves back through the photo-modulation layer PML, the transparent electrode Et2 and the transparent substrate BP2 and finally goes out from the light-to-light conversion element SLM.

Since N beams of light coming back from the light-to-light conversion element SLM have moved back and forth the photo-modulation layer PML, and since the photo-modulation layer PML is being charged with the electric field produced by the N electric charge images each corresponding to one of successive pieces of picture element information contained in the time sequential signal, the N beams of light are modified in accordance with the successive pieces of picture element information contained in the time sequential signal.

When the material constituting the photo-modulation layer PML of the light-to-light conversion element SLM is of the type capable of changing the scattering condition of light passing therethrough in accordance with the intensity of electric field, the N beams of reading light reflected back from the dielectric mirror DML have respective intensities which are changed or modified in accordance with the corresponding ones of the N successive pieces of picture element information in the time sequential signal. When the material constituting the photo-modulation layer PML is of the type which changes the condition of polarization of light or the condition of double refraction of light passing therethrough in accordance with the applied electric field intensity, the N beams of reflected reading light have respective polarizing conditions or respective polarizing surfaces which are changed in accordance with the corresponding ones of the N successive pieces of picture element information in the time sequential signal. In the latter case, by passing through an analyzer (a polarized beam splitter PBS in the illustrated embodiment), the N beams of reflected reading light coming from the light-to-light conversion element SLM can be changed into a condition that the intensity of each of the beams of light is changed in accordance with a corresponding one of the successive pieces of picture element information contained in the time sequential signal.

In the case of the display unit shown in FIG. 1, the rotating polygon mirror PM reflects N beams of writing light containing corresponding pieces of image information, toward the light-to-light conversion element SLM to which a predetermined voltage is supplied across two transparent electrodes Et1 and Et2 (FIG. 16). The N beams of writing light impinge on the light-to-light conversion element SLM from the transparent substrate BP1 side and subsequently they are converged into the photoconductive layer PCL whereupon the electric resistance of portions of the photoconductive layer PCL irradiated with the respective writing light beams changes with the quantity of radiation of light, thereby forming electric charge images at the boundary between the photoconductive layer PCL and the dielectric mirror DML. Each of the electric charge image corresponds to the quantity of radiation of the corresponding one of the N beams of writing light which are intensity-modified by the image information to be displayed. The electric charge images are composed of a pattern of electric charges each having an amount of charge which corresponds to one of N successive pieces of picture element information contained in the time sequential signal.

Due to the formation of the N electric charge images at the boundary between the photoconductive layer PCL and the dielectric mirror DML, an electric field is produced in the photo-modulation layer PML of the light-to-light conversion element SLM.

In FIG. 1, LS is a light source for projecting reading light onto a polarized beam splitter PBS. The polarized beam splitter PBS inputs an S component of polarized reading light into the light-to-light conversion element SLM from the read-out side thereof. The reading light as described above with reference to FIG. 16, passes successively through the transparent substrate BP2, the transparent electrode Et2, and the photo-modulation layer PML and subsequently impinges upon the dielectric mirror DML. Thereafter, the reading light is reflected by the dielectric mirror DML to move back through the photo-modulation layer PML, the transparent electrode Et2 and the transparent substrate BP2 from which the reading light goes out from the light-to-light conversion element SLM.

Since the N beams of reading light coming back from the light-to-light conversion element SLM have moved back and forth the photo-modulation layer PML, and since the photo-modulation layer PML is charged with the electric field produced by the N electric charge images each corresponding to one of successive pieces of picture element information contained in the time sequential signal, the N beams of reading light may have respective polarized surfaces which are changed in accordance with the linearly arranged successive N pieces of picture element information.

The N beams of reading light projected from the light-to-light conversion element SLM then move into the polarized beam splitter PBS from which a P component of polarized incident light is directed toward a projection lens Lp. The projection lens Lp projects the P component of polarized incident light onto a screen S in the form of linearly arranged N spots of light.

In the display unit shown in FIG. 1, the N beams of light emitted from the N light-emitting elements in the light-emitting element array LEEA are intensity-modified in accordance with pieces of information of a image to be displayed. By the intensity-modified N beams of light, a single straight line of light composed of linearly arranged N spots of light is projected on the light-to-light conversion element SLM for a predetermined period, thereby writing information regarding the display image into the light-to-light conversion element. Consequently, the light projection time allotted to each picture element is N times longer than that of the conventional display unit wherein light, which is intensity-modified by a time sequential signal containing pieces of picture element information of an image to be displayed, is deflected in horizontal and vertical directions by a deflector and directed toward a light-to-light conversion element SLM to write the picture element information. Thus, a writing operation relative to the light-to-light conversion element SLM can be performed in a satisfactory manner.

FIGS. 2, 3 and 4 show display units which are modified to display a color image. To this end, these display units include a light-emitting element array LEEA for each of three primary colors, a light-to-light conversion element SLM for each primary color and a three-color separation and composition optical system. Other structural components are substantially same as those of the display unit shown in FIG. 1.

The display unit shown in FIG. 2 includes three light-emitting element arrays LEEA$_r$, LEEA$_g$ and LEEA$_b$. The light-emitting element array LEEA$_r$ is constructed to concurrently receive linearly arranged N pieces of picture element information on a red image and emit from its N light-emitting elements beams of light which are intensity-modified in accordance with corresponding pieces of picture element information. Similarly, the light-emitting element array LEEA$_g$ is constructed to concurrently receive linearly arranged N pieces of picture element information on a green image and emit from its N light-emitting elements beams of light which are intensity-modified in accordance with corresponding pieces of picture element information. Furthermore, the light-emitting element array LEEA$_b$ is constructed to concurrently receive linearly arranged N pieces of picture element information on a blue image and emit from its N light-emitting elements beams of light which are intensity-modified in accordance with corresponding pieces of picture element information.

The beams of light emitted from the light-emitting element array LEEA$_r$ is converged by a condense lens Lr onto a light-to-light conversion element SLMr. Likewise, the light beams emitted from the light-emitting element array LEEA$_g$ is converged by a condenser lens Lg onto a light-to-light conversion element SLMg. In addition, the light beams emitted from the light-emitting element array LEEA$_b$ is converged by a condenser lens Lb onto light-to-light conversion element SLMb.

Light projected from the condenser lens Lr is deflected in a perpendicular direction by a polygon mirror PMr. Similarly, light projected from the condenser lens Lg is deflected in a perpendicular direction by a polygon mirror PMg, and light projected from the condenser lens Lb is deflected in a perpendicular direction by a polygon mirror PMb.

In the display unit shown in FIG. 2, three sets of optical systems each provided for one of three primary colors and each composed of the corresponding one of the light-emitting element arrays LEEA$_r$, LEEA$_g$, LEEA$_b$, the corresponding one of the condenser lens Lr, Lg, Lb, the corresponding one of the polygon mirrors Mr, PMg, PMb and the corresponding one of the light-to-light conversion elements SLMr, SLMg, SLMb. These optical systems are structurally the same as the corresponding optical systems (the light-emitting element array REA, the condenser lens L, the polygon mirror PM and the light-to-light conversion element SLM) of the display unit shown in FIG. 1. Each of the three optical systems operates in the same manner as the optical system of the display unit of FIG. 1 and hence a further description is no longer needed.

To read the picture element information from each of the light-to-light conversion elements SLMr, SLMg, SLMb, a light source LS projects reading light onto a polarized beam splitter PBS which in turn directs an S component of polarized light toward a three-color separation and composition optical system CSA. The three-color separation and composition optical system CSA separates the S component of polarized light into three beams of leading light of different primary colors (red, green and blue) and projects them onto the read-out side of the corresponding light-to-light conversion elements SLMr, SLMg, SLMb.

The three-color separation and composition optical system CSA includes a dichroic prism DP and two optical path compensation prisms Pr, Pb combined with the dichroic prism DP. The reading light coming from the light-to-light conversion element SLMr advances from one end face toward a total reflection surface Mr of the optical path compensation prism Pr. After having been reflected by the total reflection surface Mr, the reading light is directed toward the dichroic prism DP. At the same time, the reading light coming from the light-to-light conversion element SLMb advances from one end face toward a total reflection surface Mb of the optical path compensation prism Pb and subsequently is reflected by the total reflection surface Mb to move into the dichroic prism DP. Simultaneously therewith, the reading light coming from the light-to-light conversion element SLMg disposed in flush with the light-to-light conversion elements SLMr, SLMb is directly supplied to the dichroic prism DP. The dichroic prism DP performs a three-color composition or combination process and directs beams of light of a composite color toward a projection lens Lp via a polarized beam splitter PBS. Thus the projection lens Lp forms a color image on a screen S.

As described above, each of the writing optical systems has a separate polygon mirror PMr, PMg, PMb provided for deflecting beams of light containing image information of the corresponding one of the three primary colors.

The display unit shown in FIG. 3 is similar to the display unit shown in FIG. 2 but differs therefrom in that the intensity-modified beams of light emitted from the light-emitting element array LEEA$_r$, the intensity-modified beams of light emitted from the light-emitting element array LEEA$_g$, and the intensity-modified beams of light emitted from the light-emitting element array LEEA$_b$ are converged by the corresponding ones of the condenser lenses Lr, Lg, Lb onto a common oscillating mirror (galvano-mirror) GM which in turn deflects three beams of light toward the corresponding light-to-light conversion elements SLMr, SLMg, SLMb.

The use of the common galvano-mirror GM (common deflector) requires that the light-emitting element arrays LEEA$_r$, LEEA$_g$, LEEA$_b$ provided for three separate colors and the light-to-light conversion elements SLMr, SLMg, SLMb also provided for three separate colors must be disposed in two separate curved planes so as to equalize the length of optical paths in the respective writing optical systems.

The operation of the display unit shown in FIG. 3 can readily be understood from the operation of the display unit described above with reference to FIG. 2 and hence a further description is no longer needed.

The display unit shown in FIG. 4 differs from the display unit of FIG. 3 in that a single light-emitting element array LEEA is longitudinally separated into three parts each having a group of linearly arranged light-emitting elements. Each group of light-emitting elements emit beams of light intensity-modified by information of one of three separate primary color images. The light beams emitted from each part of the light-emitting element array LEEA are projected by a single condenser lens L onto a single oscillating mirror (galvano-mirror) GM. The galvano-mirror GM deflects three groups of beams of light of different colors toward the corresponding light-to-light conversion elements SLMr, SLMg, SLMb disposed in a flat plane. In order to display an image with the same resolution as the image formed by the display units shown in FIGS. 2 and 3, the number of the light-emitting elements of the light-emitting element array LEEA is three times as many as the number of the light-emitting elements of each of the light-emitting element arrays LEEA$_r$, LEEA$_g$, LEEA$_b$. Each of the three separate longitudinal parts of the light-emitting element array LEEA may be composed of a single light-emitting element array having the same number of light-emitting elements as the each part of the light-emitting element array LEEA.

The operation of the display unit shown in FIG. 4 can readily be understood from the description of operation of the display unit shown in FIG. 2 and a further description is not necessary to avoid duplication.

Figure 5:
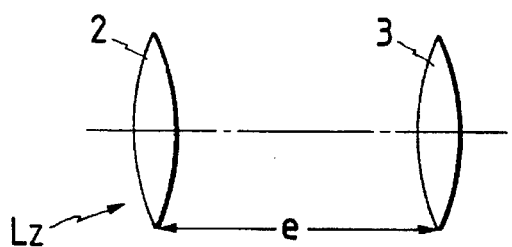
FIG. 5 is a diagrammatical view showing the construction of a zoom lens.

FIG. 5 illustrates the principle of construction and operation of a zoom lens Lz. The zoom lens Lz includes first convex lens 2 having a focal length f1 and a second convex lens 3 having a local length f2. A combined focal length f of the two convex lenses 2, 3 (i.e. the focal length of the zoom lens Lz) is given by the following expression.

$$f = f1 \times f2 / (f1 + f2 - e)$$

where e is a distance between principal planes of the convex lenses 2, 3. As appears clear from the foregoing expression, by relatively moving the convex lenses 2, 3 to change the distance e therebetween, the focal length f of the zoom lens Lz can be varied continuously.

Figure 6:
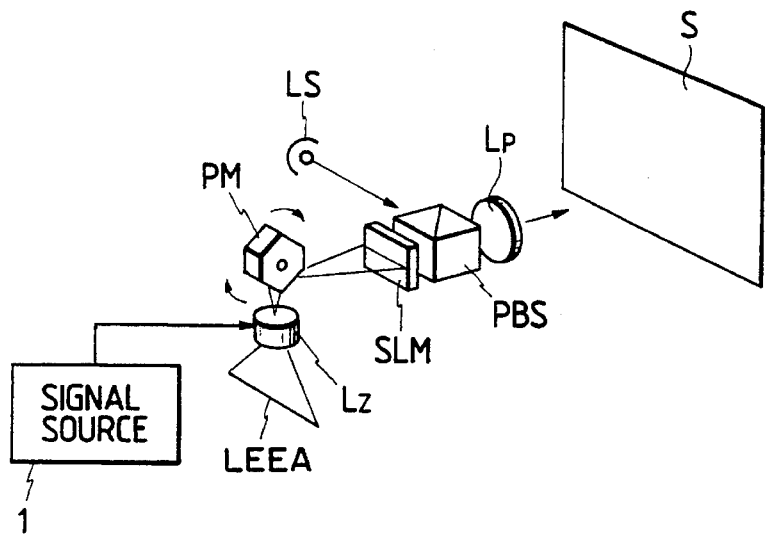
FIG. 6 is a diagrammatical perspective view of a display unit according to a fifth embodiment of this invention incorporating the zoom lens.

A display unit shown in FIG. 6 is structurally the same as the display unit shown in FIG. 1 with the exception that a zoom lens Lz is used in place of the condenser lens L. The focal length of the zoom lens Lz is changed by a control signal issued from a signal source 1.

Figure 7:
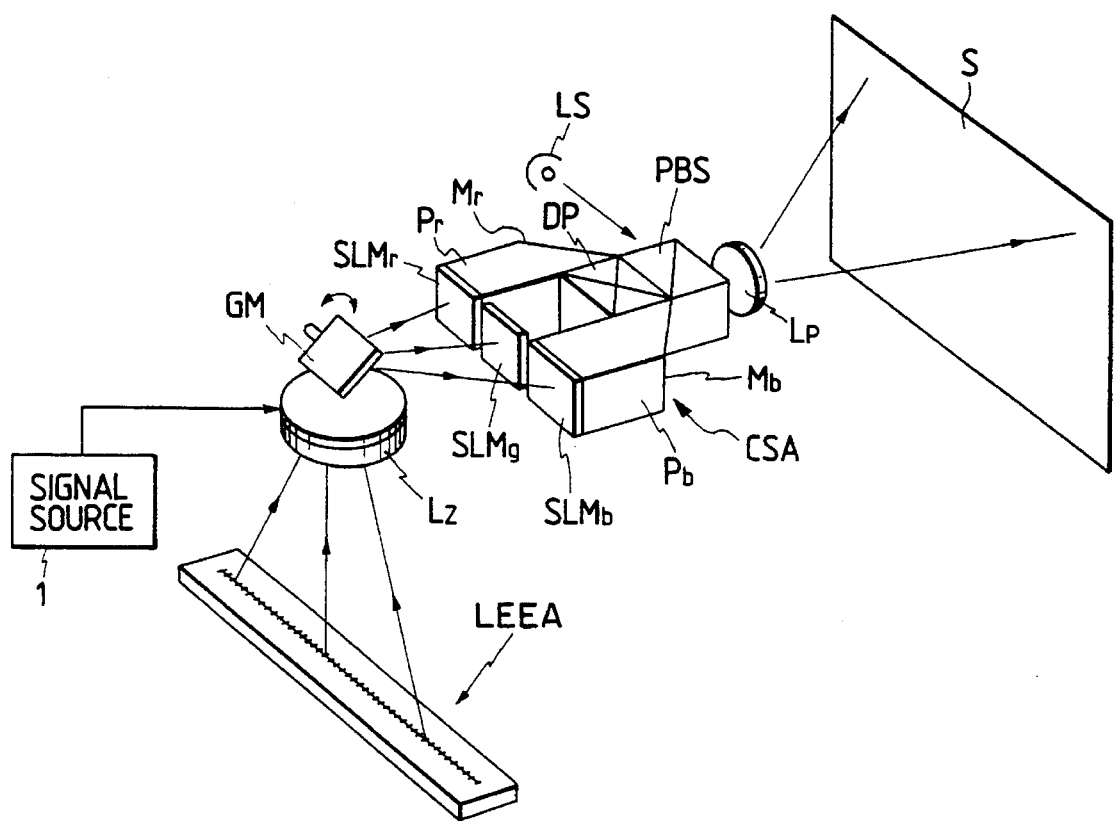
FIG. 7 is a diagrammatical perspective view of a display unit according to a sixth embodiment.

FIG. 7 shows a display unit which is identical in construction to the display unit of FIG. 4 except that it includes a zoom lens Lz in place of the condenser lens L. This display unit includes a signal source 1 for producing a control signal to change the focal length of the zoom lens Lz.

By changing the focal length of the zoom lens Lz, the display units shown in FIGS. 6 and 7 are able to vary the size of a display image without changing the brightness of the display image. The zoom lens Lz may have any suitable construction including two, three, four or five groups of lens elements well known per se.

Figures 8, 9:
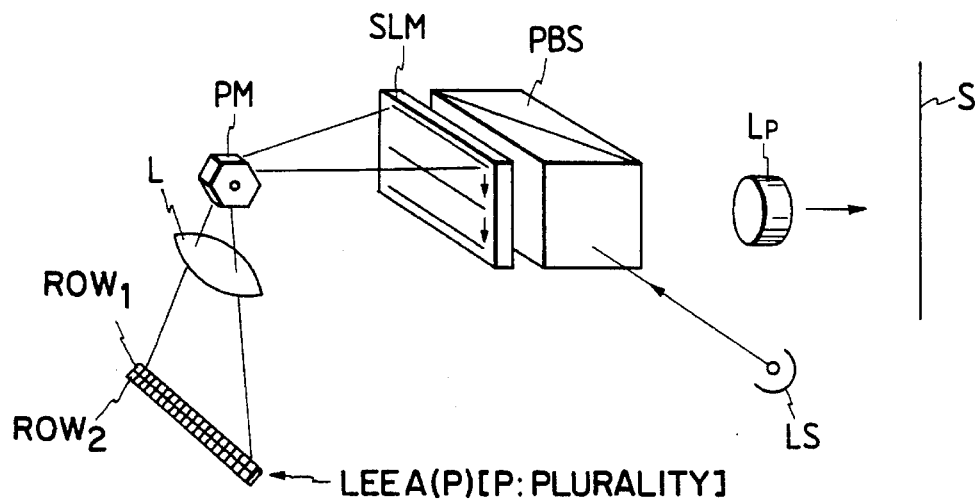

FIG. 8 shows a display unit which is constructed to increase the quantity of light projected on the screen S or the quantity of writing light incident to the light-to-light conversion element SLM. FIGS. 9, 10(a) through 10(c) and 11(a) through 11(f) illustrate the manner in which the quantity of light on the screen S or the quantity of writing light supplied to the light-to-light conversion element SLM is increased.

The display unit shown in FIG. 8 includes a plurality (two being shown) of light-emitting element arrays ROW$_1$, ROW$_2$ each including linearly arranged N picture elements or pixels and the corresponding N light-emitting elements. The light-emitting element arrays ROW$_1$, ROW$_2$ are disposed side by side with their N light-emitting elements laterally aligned with each other. The individual light-emitting elements of each light-emitting element array ROW$_1$, ROW$_2$ simultaneously emit beams of light for a predetermined period of time at respective intensities determined in accordance with individual pieces of picture element information of one of successive rows of pieces of picture element information. The beams of light thus emitted are simultaneously deflected in a direction perpendicular to the direction of alignment of the light beams emitted from each light-emitting element array (i.e., in a direction perpendicular to the longitudinal direction of the light-emitting element array). In synchronism with this deflecting action, the rows of picture element information, used for exciting the respective light-emitting elements of each light-emitting element array, are supplied to the light-emitting element arrays while successively shifting at intervals of said predetermined time period in a direction opposite to the direction of movement of light caused by the deflecting action.

With this construction, the quantity of light can be increased for the reasons described below with reference to FIGS. 9, 10(a)–10(c) and 11(a)–11(f).

FIG. 9 shows a typical example of arrangement of picture element arrays of a display image. The display image is composed of first to m arrays of picture elements. Each of the picture element arrays includes N picture elements arranged in a row, as indicated by 11, 12, 13 . . . 1n, 21, 22, 23 . . . 2n, and 31, 32, 33 . . . 3n, for example. Each picture element array is composed of N elements formed when linearly arranged light-emitting elements of one light-emitting element array are driven to simultaneously emit light for a predetermined period of time at respective intensities determined in accordance with corresponding pieces of picture element information of one of separate rows of pieces of picture element information.

FIGS. 10(a)–10(c) show a group of light-emitting element arrays LEEA(P)[P:PLURALITY] composed of a plurality of light-emitting element arrays ROW$_1$, ROW$_2$, ROW$_3$ . . . disposed side by side, with the light-emitting elements of the adjacent light-emitting element arrays laterally aligned with each other. Each of the light-emitting element arrays includes linearly arranged N picture elements or pixels and corresponding N light-emitting elements, as described above. To the N light-emitting elements of each of the light-emitting element arrays $ROW_1$, $ROW_2$, $ROW_3$ . . . in the light-emitting element array group LEEA(P)[P:PLURALITY] N pieces of picture element information $S_{11}$, $S_{12}$, $S_{13}$ . . . $S_{1n}$, $S_{21}$, $S_{22}$, $S_{23}$ . . . $S_{2n}$ etc., etc., up to $S_{51}$, $S_{52}$, $S_{53}$ . . . $S_{5n}$ are assigned, respectively.

The pieces of picture element information indicated by $S_{11}$, $S_{12}$, $S_{13}$ . . . $S_{1n}$- $S_{51}$, $S_{52}$, $S_{53}$ . . . $S_{5n}$ shown in FIGS. 10(a)–10(c) are pieces of picture element information in a time sequential signal which are arranged in succession on the time base. A piece of picture element information having a larger subscript follows or comes behind the piece of picture element information having a smaller subscript.

The number of light-emitting element array constituting the light-emitting element array group LEEA(P)[P:PLURALITY] is at least two, and for purposes of description, the light-emitting element array group LEEA(P)[P:PLURALITY] shown in FIGS. 10(a)–10(c) and FIGS. 11(a)–11(f) is composed of three light-emitting element arrays $ROW_1$, $ROW_2$, $ROW_3$.

As shown in FIGS. 10(a)–10(c), the light-emitting elements of each light-emitting element array are driven to simultaneously emit beams of light for a predetermined period of time at respective intensities determined in accordance with corresponding pieces of picture element information of one of different rows of pieces of picture element information.

More specifically, as shown in FIG. 10(a), the N light-emitting elements of the light-emitting element array $ROW_1$ simultaneously emit beams of light for a predetermined period of time in accordance with the corresponding pieces of picture element information $S_{11}$, $S_{12}$, $S_{13}$ . . . $S_{1n}$ of the first row of pieces of picture element information. Similarly, the N light-emitting elements of the light-emitting element array $ROW_2$ simultaneously emit beams of light for the predetermined period of time in accordance with the corresponding pieces of picture element information $S_{21}$, $S_{22}$, $S_{23}$ . . . $S_{n2}$ of the second row of pieces of picture element information. Furthermore, the N light-emitting elements of the light-emitting element array $ROW_3$ simultaneously emit beams of light for a predetermined period of time in accordance with the corresponding pieces of picture element information $S_{31}$, $S_{32}$, $S_{33}$ . . . $S_{3n}$ of the third row of pieces of picture element information.

When the predetermined time period has elapsed, the light-emitting element array group LEEA(P)[P:PLURALITY] terminates its light-emitting operation under the condition shown in FIG. 10(a) and begins the next light-emitting operation under the condition shown in FIG. 10(b) in which the N light-emitting element of the light-emitting element array $ROW_1$ simultaneously emit light for a predetermined period of time in accordance with the corresponding pieces of picture element information $S_{21}$, $S_{22}$, $S_{23}$ . . . $S_{2n}$ of the first row of pieces of picture element information. Similarly, the N light-emitting elements of the light-emitting element array $ROW_2$ simultaneously emit light for the predetermined period of time in accordance with the corresponding pieces of picture element information $S_{31}$, $S_{32}$, $S_{33}$ . . . $S_{3n}$ of the second row of pieces of picture element information. Furthermore, the N light-emitting elements of the light-emitting element array $ROW_3$ simultaneously emit light for a predetermined period of time in accordance with the corresponding pieces of picture element information $S_{41}$, $S_{42}$, $S_{43}$ . . . $S_{4n}$ of the third row of pieces of picture element information.

When the predetermined time period has elapsed, the light-emitting element array group LEEA(P)[P:PLURALITY] terminates its light-emitting operation under the condition shown in FIG. 10(b) and resumes the light-emitting operation under the condition shown in FIG. 10(c). As shown in FIG. 10(c), the N light-emitting elements of the light-emitting array $ROW_1$ simultaneously emit light for a predetermined period of time in accordance with the corresponding pieces of picture element information $S_{31}$, $S_{32}$, $S_{33}$ . . . $S_{3n}$ of the first row of pieces of picture element information. Similarly, the N light-emitting elements of the light-emitting element array $ROW_2$ simultaneously emit light for the predetermined period of time in accordance with the corresponding pieces of picture element information $S_{41}$, $S_{42}$, $S_{43}$ . . . $S_{4n}$ of the second row of pieces of picture element information. Furthermore, the N light-emitting elements of the light-emitting array $ROW_3$ simultaneously emit light for a predetermined period of time in accordance with the corresponding pieces of picture element information $S_{51}$, $S_{52}$, $S_{53}$ . . . $S_{5n}$ of the third row of pieces of picture element information.

As described above, each time when the predetermined time period has elapsed, the rows of pieces of picture element information, used for driving the respective light-emitting element arrays $ROW_1$, $ROW_2$, $ROW_3$ of the light-emitting element group LEEA(P)[P:PLURALITY] are shifted successively between adjacent light emitting element arrays in a direction opposite to the direction of deflection of light caused by the deflector. Beams of light simultaneously emitted from the light-emitting elements of each of the light-emitting element arrays $ROW_1$, $ROW_2$, $ROW_3$ of the light-emitting element group LEEA(P)[P:PLURALITY] are simultaneously deflected in a direction perpendicular to the direction of alignment of light (i.e., the longitudinal direction of the light-emitting element array) by means of the deflector. In this instance, if the aforementioned shift of the light-emitting operation continuing over the predetermined time period is performed in synchronism with the speed of deflection of light caused by the deflector, each individual piece of picture element information of a display image is displayed in such a manner that it is superposed three times (i.e., plural times as many as the number of the light-emitting element arrays in the array group LEEA(P)[P:PLURALITY].

The superposition of each piece of picture element information of the display image will be described in greater detail with reference to FIGS. 11(a)–11(f). In FIGS. 1(a)–11(f), reference characters 11, 12, 13–81, 82, 83 designate picture elements corresponding in position to the position of the picture elements indicated by 11, 12, 13 shown in FIG. 9. In addition, reference characters $I_{S11}$, $I_{S12}$, $I_{S13}$–$I_{S81}$, $I_{S82}$, $I_{S83}$ designate pieces of optical information emitted from the corresponding light-emitting elements when the light-emitting elements are supplied with pieces of picture element information $S_{11}$, $S_{12}$, $S_{13}$ . . . $S_{83}$.

FIG. 11(a) shows the pieces of optical information which are assigned to the position of the respective picture elements of a display image when the light-emitting element arrays $ROW_1$, $ROW_2$, $ROW_3$ in the array group $REA_w$ are supplied with those pieces of picture element information shown in FIG. 10(a). Similarly, FIG. 11(b) shows the pieces of optical information which are assigned to the position of the respective picture elements of an image when the light-emitting arrays $ROW_1$, $ROW_2$, $ROW_3$ in the array group LEEA(P)[P:PLURALITY] are supplied with those pieces of picture element information shown in FIG. 10(b). In addition, FIG. 11(c) shows the pieces of optical information which are assigned to the position of the respective picture elements of an image when the light-emitting element arrays ROW$_1$, ROW$_2$, ROW$_3$ in the array group of REA$_w$ are supplied with those pieces of picture element information shown in FIG. 10(c). Furthermore, FIGS. 11(d)–11(f) show successive changes in position of pieces of optical information which take place after the condition shown in FIG. 11(c).

As appears clear from FIGS. 11(a)–11(c), the pieces of optical information I$_{S31}$, I$_{S32}$, I$_{S33}$ corresponding to the position of the same picture elements 31, 32, 33, for example, are displayed plural times as many as the number of the light-emitting element arrays ROW$_1$, ROW$_2$, ROW$_3$ in the array group LEEA(P)[P:PLURALITY] (three times in the illustrated embodiment). 1, This is true for the position of picture elements 11, 12 and 13 or 41, 42 and 43.

In the case of the display unit shown in FIG. 8, rows of pieces of picture element information used for driving the light-emitting elements of the two juxtaposed light-emitting element arrays ROW$_1$, ROW$_2$, ROW$_3$ in the array group LEEA(P)[P:PLURALITY], are shifted successively between the adjacent light-emitting element arrays each time when the predetermined time period has elapsed. On the other hand, beams of light emitted from the light-emitting elements of each of the two adjacent light-emitting elements arrays ROW$_1$ and ROW$_2$ are projected by the condenser lens L onto the rotating polygon mirror PM. The polygon mirror PM deflects the beams of light simultaneously in a direction perpendicular to the longitudinal direction of the light-emitting element arrays. In synchronism with the deflection of light beams by means of the polygon mirror PM, the foregoing shift of rows of pieces of picture element information is performed, so that the same piece of picture element information of a display image is directed, as incident writing light, to the light-to-light conversion element SLM in such a manner that it is superposed plural times as many as the number of the light-emitting element arrays (two in the illustrated embodiment) ROW$_1$, ROW$_2$ in the array group LEEA(P)[P:PLURALITY].

As described above, a plurality of light-emitting element arrays each composed of N picture elements or pixels arranged linearly and corresponding N light-emitting elements are disposed side by side, with the N light-emitting elements of one light-emitting element array laterally aligned with the N light-emitting elements of another light emitting element array. The light-emitting elements of each of the light-emitting element arrays are driven to simultaneously emit beams of light for a predetermined period of time at respective intensities determined in accordance with corresponding pieces of picture element information of one of successive rows of pieces of picture element information. The beams of light emitted from each respective light-emitting element array are simultaneously deflected in a direction perpendicular to the longitudinal direction of the light-emitting element arrays. In synchronism with the deflection of the light beams, the rows of pieces of picture element information supplied for driving the light-emitting elements of the respective light-emitting element arrays are shifted successively at intervals of the predetermined time period in a direction opposite to the direction of movement of the light beams caused by the deflection. With this arrangement, the quantity of light projected onto the screen S and the quantity of light supplied as writing light to the light-to-light conversion element SLM can be increased. Consequently, even when a plurality of low intensity light-emitting element arrays are used, it is possible to display a bright or intensive image on the screen. Furthermore, it is possible to write a low sensitivity light-to-light conversion element by using such relatively low intensity light-emitting element arrays.

Figure 12:
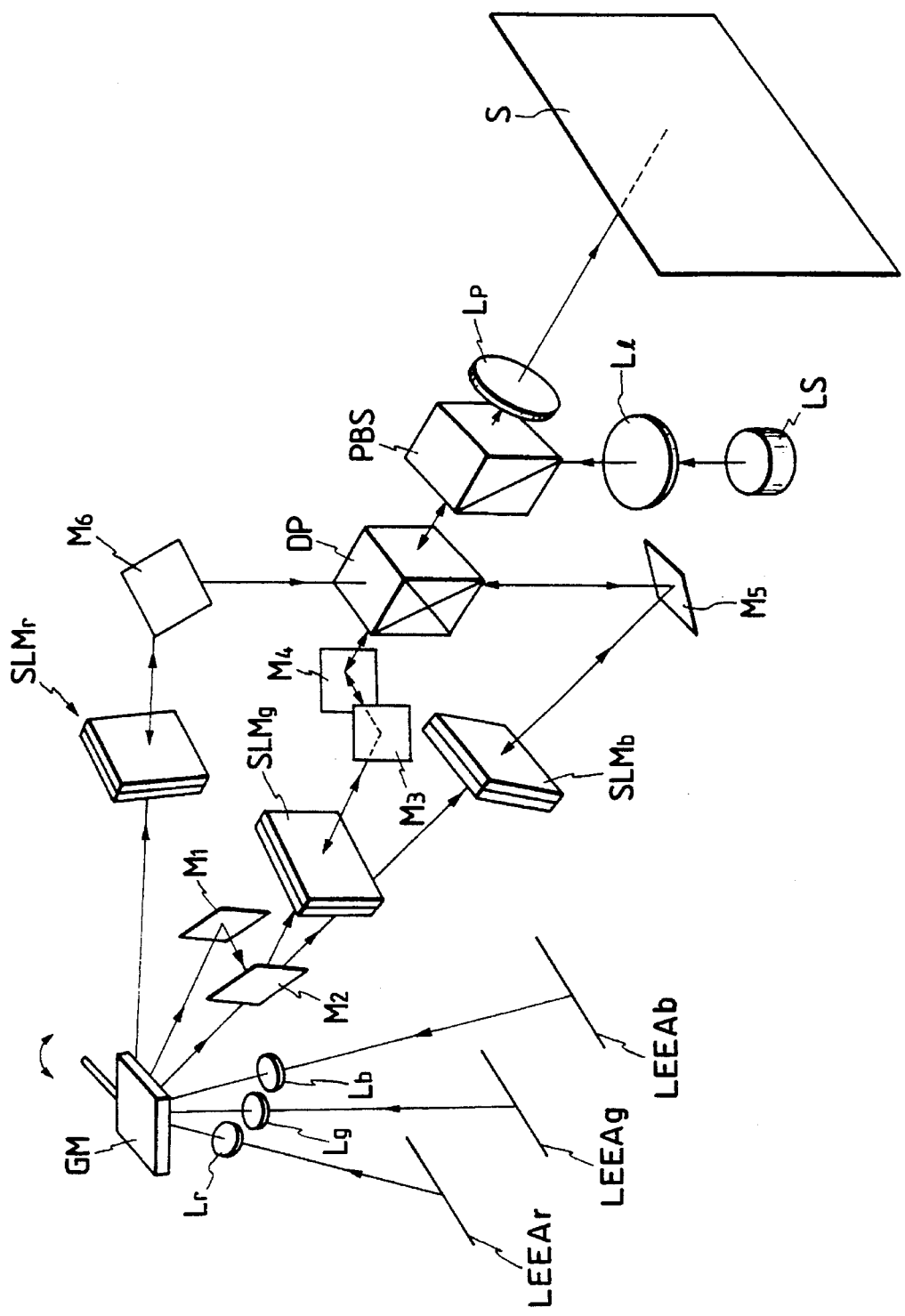
FIG. 12 is a diagrammatical perspective view of a display unit according to an eighth embodiment of this invention.

A display unit shown in FIG. 12 is similar to the display unit shown in FIG. 3 but differs therefrom in that four reflecting mirrors M1–M4 are disposed in an optical path so as to equalize the length of an optical path extending between a light-emitting element array REA$_g$ and a common oscillating mirror (galvano-mirror) GM and the length of an optical path extending between light-emitting element arrays LEEA$_r$, LEEA$_b$ and the common galvano-mirror GM.

When linearly arranged N pieces of picture element information on a red image are applied simultaneously, light-emitting elements of the light-emitting element array LEEA$_r$ simultaneously emit beams of light which are intensity-modified in accordance with the corresponding pieces of picture element information. The light beams are projected by a condenser lens Lr onto the common galvano-mirror GM which in turn deflects the light beams. The deflected light beams are supplied to a light-to-light conversion element SLMr as writing light.

Similarly, when linearly arranged N pieces of picture element information on a blue image are applied simultaneously, light-emitting elements of the light-emitting element array REA$_b$ simultaneously emit beams of light which are intensity-modified in accordance with the corresponding pieces of picture element information. The light beams are projected by a condenser lens Lb onto the common galvano-mirror GM which in turn deflects the light beams. The deflected light beams are supplied to a light-to-light conversion element SLMb as writing light.

In addition, when linearly arranged N pieces of picture element information on a green image are applied simultaneously, light-emitting elements of the light-emitting element array REA$_g$ simultaneously emit beams of light which are intensity-modified in accordance with the corresponding pieces of picture element information. The light beams are projected by a condenser lens Lg onto the common galvano-mirror GM which in turn deflects the light beams. The deflected light beams are supplied via the first and second reflecting mirrors M1 and M2 to the light-to-light conversion element SLMg as writing light.

In each of the light-to-light conversion elements SLMr, SLMg, SLMb, a portion of a photoconductive layer PCL (see FIG. 16) on which the light beams are gathered or focused changes its electric resistance in accordance with the quantity of radiation of light, thereby forming an image or pattern of electric charges at the boundary between the photoconductive layer PCL and the dielectric mirror DML. The quantity of charges of the thus formed image corresponds to the quantity of radiation of writing light which is intensity-modified by image information on the corresponding color of a display image. The electric charge image thus formed produces an electric field acting on a photo-modulation layer PML of each light-to-light conversion element SLMr, SLMg, SLMb.

A light source LS directs reading light toward a polarized beam splitter PBS via a lens L1. An S component of polarized light projected from the polarized beam splitter PBS into a dichroic prism DP which serves as a three-color separation and composition optical system.

The dichroic prism DP separates incident reading light into three beams of reading light of different colors (red, green and blue). The red beam of reading light is directed by the dichroic prism DP to the read-out side of the light-to-light conversion element SLMr via a reflecting mirror M6. At the same time, the green beam of reading light is directed by the dichroic prism DP to the read-out side of the light-to-light conversion element SLMg via the reflecting mirrors M4, M3. Similarly, the blue beam of reading light is directed by the dichroic prism DP to the read-out side of the light-to-light conversion element SLMb.

The reading light coming from the light-to-light conversion element SLMr is reflected by the reflecting mirror M6 and then moves into the dichroic prism DP. Similarly, the reading light coming from the light-to-light conversion element SLMg is reflected by the reflecting mirrors M3, M4 and subsequently moves into the dichroic prism DP. In addition, the reading light coming from the light-to-light conversion element SLMb is reflected by the reflecting mirror M5, then moving into the dichroic prism DP.

The respective beams of reading light incident to the dichroic prism DP are subjected to a three-color combination or composition process and, thereafter, a P component of polarized light is projected from the polarized beam splitter PBS toward a projecting lens Lp which in turn projects the same onto screen S whereby a color image appears on the screen S.

In the display unit shown in FIG. 12, the light-emitting element arrays LEEA$_r$, LEEA$_g$, LEEA$_b$ each provided for one of three primary colors are disposed in a flat plane, however, by using the reflecting mirrors M1–M4, it is possible to take up or cancel out the difference between the length of an optical path extending between the light-emitting element array REA$_g$ and the common galvano-mirror GM, and the length of an optical path extending between each of the light-emitting element arrays LEEA$_r$ and LEEA$_b$ and the common galvano-mirror GM.

FIGS. 17 through 25 show various forms of the display unit which are so constructed as to utilize an information recording medium as a second image forming means or source in addition to a first image forming means composed of a light-emitting element array.

Figure 17:
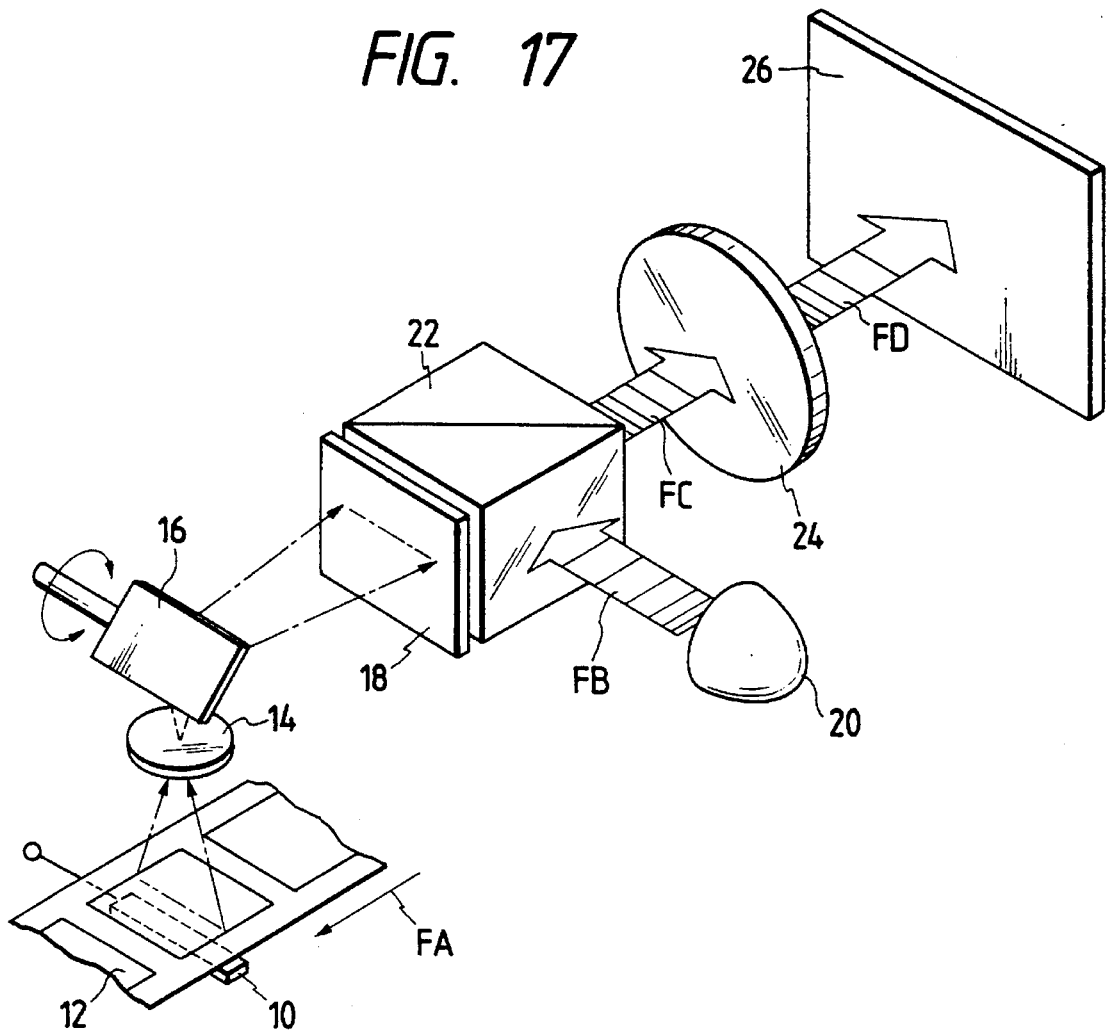

The display unit shown in FIG. 17 includes, in addition to an elongate light-emitting element array 10, an information recording medium 12, an image-forming lens 14 and a deflection mirror 16 that are disposed in an output optical path of the light-emitting element array 10. With this arrangement, image information recorded on the information recording medium 12 is projected on a light-to-light conversion element 18.

To the light-to-light conversion element 18, reading light from a light source 20 is inputted via a polarized beam splitter 22. The polarized beam splitter 22 has an output optical path in which a projection lens 24 and a screen 26 are disposed.

The light-emitting element array 10 includes a number of LEDs, ELs, LDs or other light-emitting element or devices arranged linearly at a high density. The information recording medium 12 may be of any material which is capable of modulating incident light according to recorded information. Examples of such material are a polymer-liquid crystal composite film, PLZT, a 35 mm film for camera, a 70 mm film, etc. In the illustrated embodiment, the information recording medium 12 is in the form of a continuous elongate film and is adapted to be fed in a direction of the arrow FA by a suitable feed means, not shown. The feeding of this information recording medium 12 is performed in synchronism with the scanning of linear beams of light by a deflection mirror 16.

The light-to-light conversion element 18 includes a photoconductive layer and a photo-modulation layer. When exposed to light, the photoconductive layer changes its resistance value in accordance with intensity distribution of incident light. In accordance with this change in resistance value, the photo-modulation layer modulates reading light. The modulated light is reflected and outputted from the light-to-light conversion element 18. With this light-to-light conversion, the intensity of reading light can be increased even when light incident to the photoconductive layer is weak.

The display unit of the foregoing construction operates as follows.

When the source of an image to be displayed is a time sequential signal, the information recording medium 12 is no longer needed and hence removed, and the time sequential signal is supplied to the light-emitting element array 10 from the outside of the display unit. Succeeding operation is substantially the same as the operation of the display unit shown in FIG. 1 and hence a further description is not needed.

When the image forming source is given in the form of an information recording medium 12, the information recording medium 12 is set over the light-emitting element array 10, as shown in FIG. 17 and subsequently the light-emitting element array 10 is driven into a full emission state. In this instance, the deflection mirror 16 is rotated in synchronism with the forward movement of the information recording medium 12 in the direction of the arrow FA, so that a piece of information recorded on one frame of the information recording medium 12 is projected onto the light-to-light conversion element 18.

Image information recorded in the light-to-light conversion element 18 is read out in the manner described below. Reading light from the light source 20 advances in the direction indicated by the arrow FB and impinges on the polarized beam splitter 22 where the reading light changes its optical path and moves into the light-to-light conversion element 18. After having been modulated by the light-to-light conversion element in accordance to the recorded image information, the reading light is reflected back to the polarized beam splitter 22. The modulated light passes through the polarized beam splitter 22 as indicated by the arrow FC and then through the projection lens 24 as indicated by the arrow FD and finally is projected on the screen 26. The image information recorded on the information recording medium 12 is thus displayed on the screen 26.

When the recorded image information is to be displayed in the form of a static image, a desired frame of the information recording medium 12 is repeatedly projected on the light-to-light conversion element 18 either by rewinding the information recording medium 12 by one frame during a blank between the desired frame and the next following frame, or by feeding the information recording medium 12 backward upon completion of projection of the desired, while at the same time, the deflection mirror 16 is rotated in reverse direction without blanking.

As described above, by using the light-to-light conversion element 18, image information given in various forms can be displayed intensely even when output light from the light-emitting element array 10 is weak.

Figure 18:
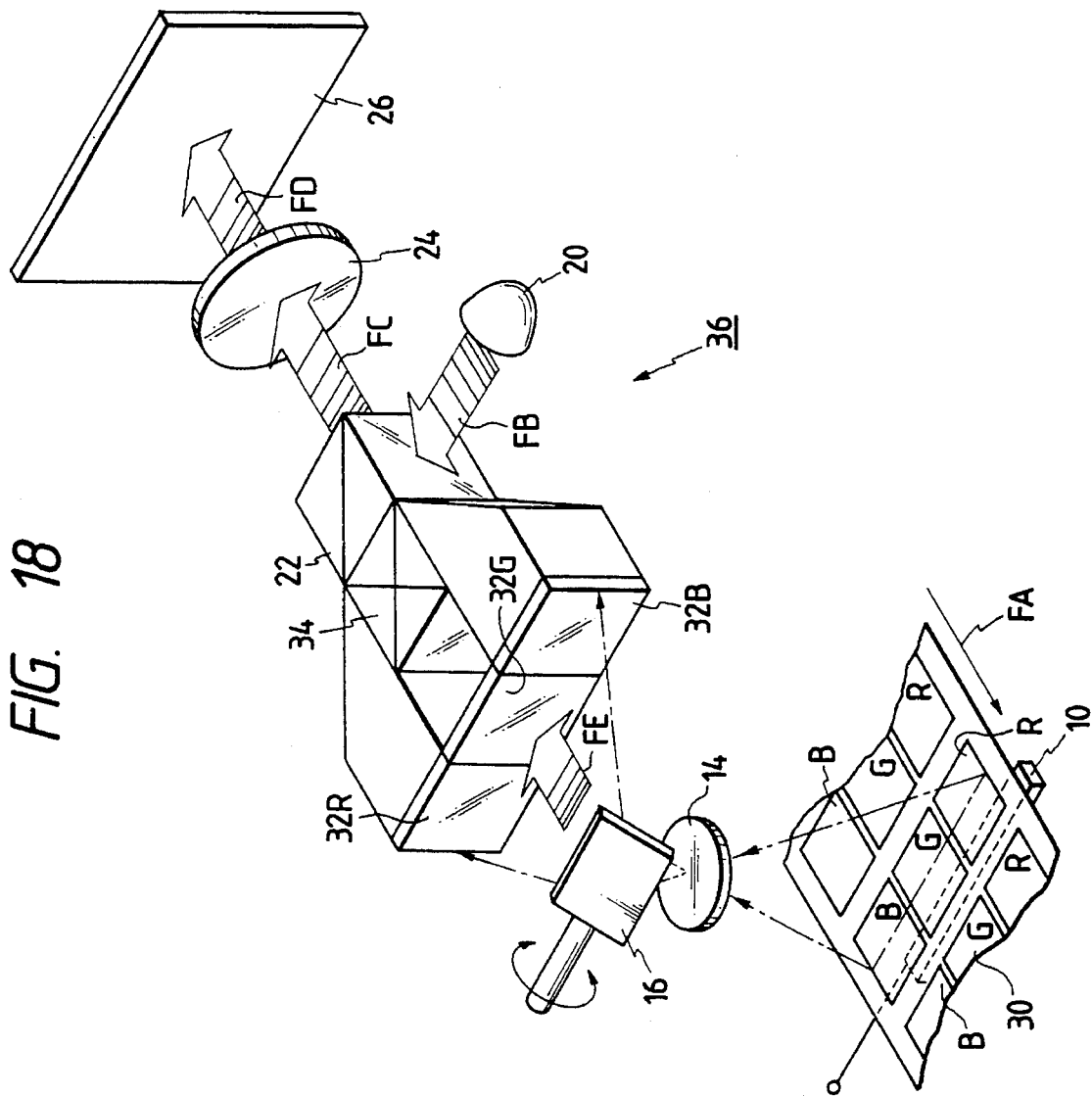

The display unit shown in FIG. 18 is similar to the display unit shown in FIG. 17 but differs therefrom in that it can display a color image. To this end, an information recording medium 30 has three rows of images of different colors R, G, R (red, green and blue) which are projected onto corresponding light-to-light conversion elements 32R, 32G, 32B in the same manner as described above with respect to the foregoing embodiment shown in FIG. 17. A color separating prism 34 and a polarizing beam splitter 22 are disposed in a reading light output optical path of the light-to-light conversion elements 32R, 32G, 32B. In addition, a light source 20 and a projection lens 24 are disposed in the same manner as those of the foregoing embodiment shown in FIG. 17. A color projection system 36 is thus constructed.

The display unit of the foregoing construction operates as follows. The images of different colors R, G, B on the information recording medium 30 are projected by the action of the light-emitting element array 10, the image forming lens 14 and the deflection mirror 16 onto the corresponding light-to-light conversion elements 32R, 32G, 32B, as indicated by the arrow FE. On the other hand, reading light from the light source 20 is inputted to the light-to-light conversion elements 32R, 32G, 32B after it is subjected to a color separation process by the color separation prism 34. The images of different colors R, G, B are read out by the corresponding color beams of light, then combined by the color separation prism 34, and finally outputted toward the screen 26. Thus, the different color images R, G, B on the information recording medium 30 appear on the screen 26 as a composite color image.

The display unit shown in FIG. 19 is similar to the display unit shown in FIG. 18 as it is constructed to display a color image. However, in this display unit, image information is read out form an information recording medium 40 by means of a light source 42 other than by the light-emitting element array 10. The information recording medium 40 is of the type which stores pieces of image information of different colors R, G, B in the form of charged images. To read out the image information, the charged images must be converted into optical images. To this end, the display unit includes a reproducing head 44 including a photo-modulation means.

The optical images of separate colors R, G, B read out from the information recording medium 40 are projected via a suitable image forming lens 46 onto a semi-transparent mirror 48 which in turn reflects the optical images into the color projection system 36.

On the other hand, linear beams of light emitted from the light-emitting element array 10 are reflected by the deflection mirror 16 and projected onto the semi-transparent mirror 48 and thence to the color projection system 36.

Figure 20:
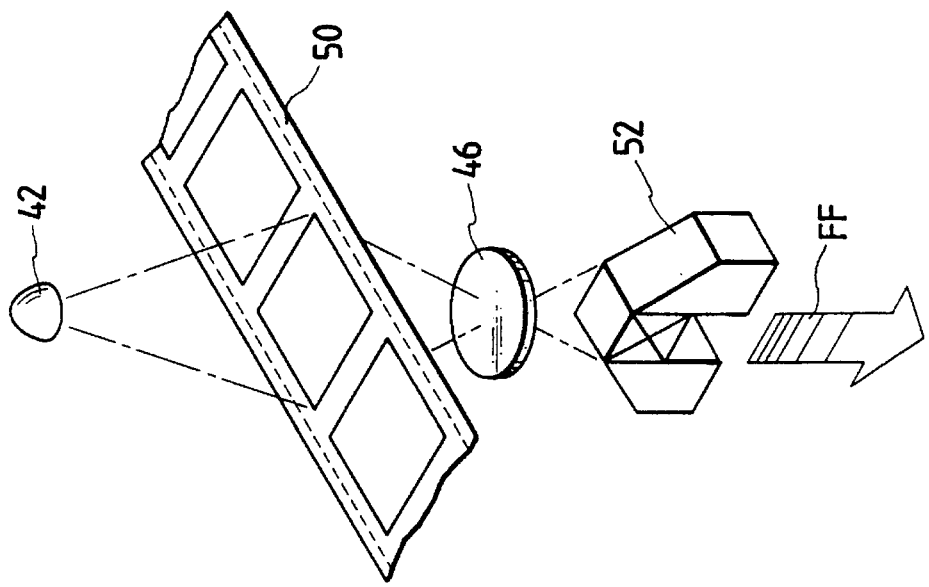
FIG. 20 is a diagrammatical perspective view showing a main portion of a display unit according to a twelfth embodiment.

The display unit shown in FIG. 20 is used with an information recording medium such as a 35 mm film having optical images not separated into images of different primary colors R, G, B. To this end, the display unit includes a color separation prism 52 for forming optical images of different colors R, G, B. The color images R, G, B thus separated then advance in the direction of the arrow FF toward the semi-transparent mirror 49 (see FIG. 19) and then to the color projection system 36 (see FIG. 19) where they are subjected to a light-to-light conversion process and also to a color composition or combination process. The optical images are finally projected onto a screen 26 (see FIG. 19).

Figures 21A, 21B:
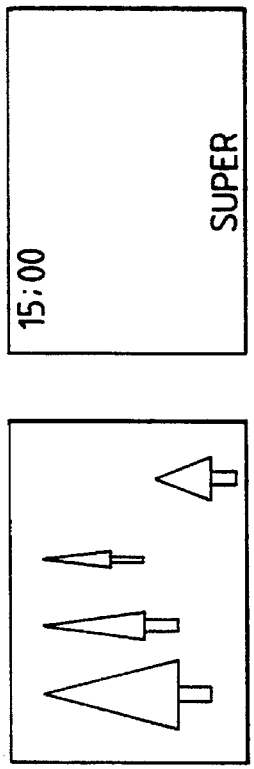
FIGS. 21(a) through 21(c) are explanatory pictorial views illustrative of a thirteenth embodiment of this invention.
Figure 21C:
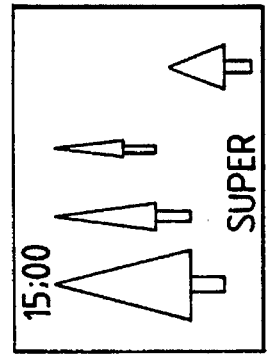

The display unit shown in FIG. 19 is able to superimpose an image resulting from the information recording medium 40 and an image resulting from the light-emitting element array 10 by combining them by means of the semi-transparent mirror 48. Assuming that the image resulting from the information recording medium 50 is as shown in FIG. 21(a) and the image resulting from the light-emitting element array 10 is as shown in FIG. 21(b), then a composite image as shown in FIG. 21(c) appears on the screen 26.

Figure 22:
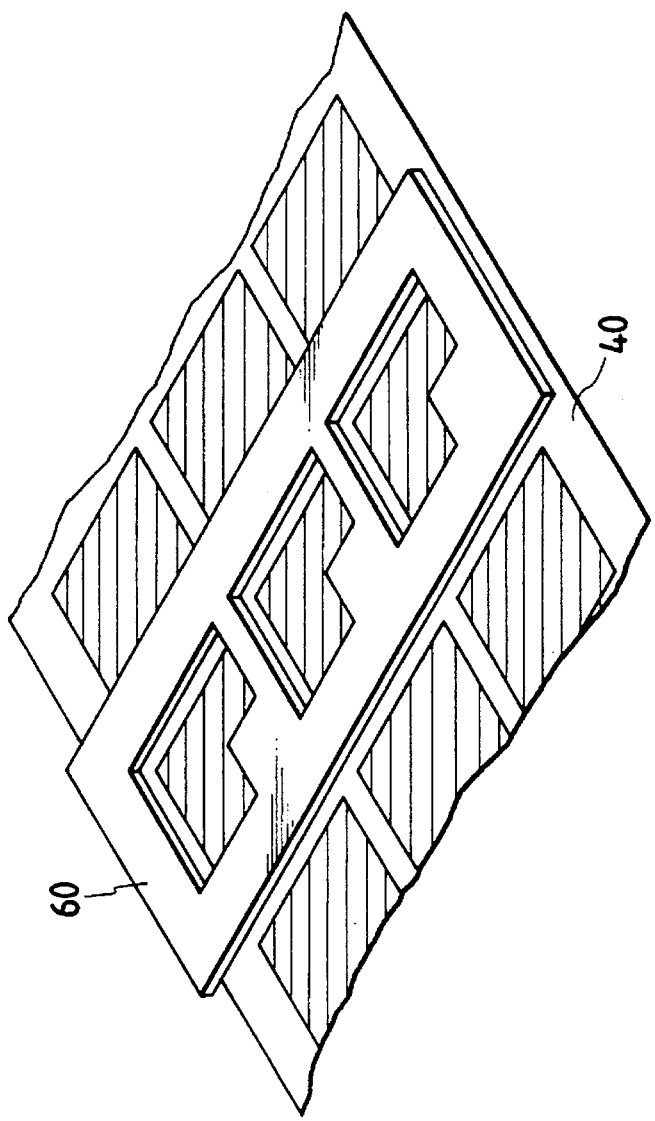
FIGS. 22 and 23(a) through 23(c) are explanatory views illustrative of a fourteenth embodiment of this invention.

A composite image formed by superimposition is sometimes non-distinctive due mainly to overlapping of images. In order to avoid this, a mask 60 is laid over the information recording medium 40 so as to shield a portion (lower right portion in the illustrated embodiment) of each piece of image, as shown in FIG. 22. With the mask 60 thus provided, an image resulting from the information recording medium 40 is clipped at its lower right portion, as shown in FIG. 23(a).

Figures 23A, 23B:
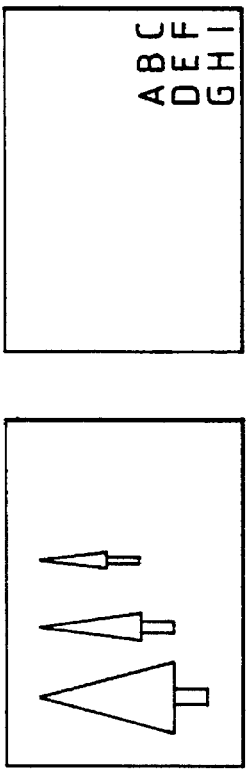
Figure 23C:
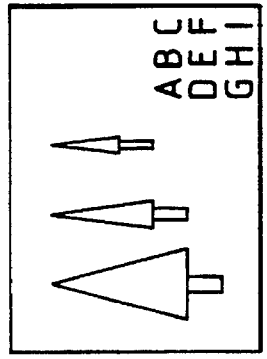

If an image resulting from the light-emitting element array 10 is as shown in FIG. 23(b), then a composite image shown in FIG. 23(c) appears on the screen. According to this embodiment, both images are combined together but they do not overlap with each other. Accordingly, the composite image is clear and easy to sight.

Figure 24:
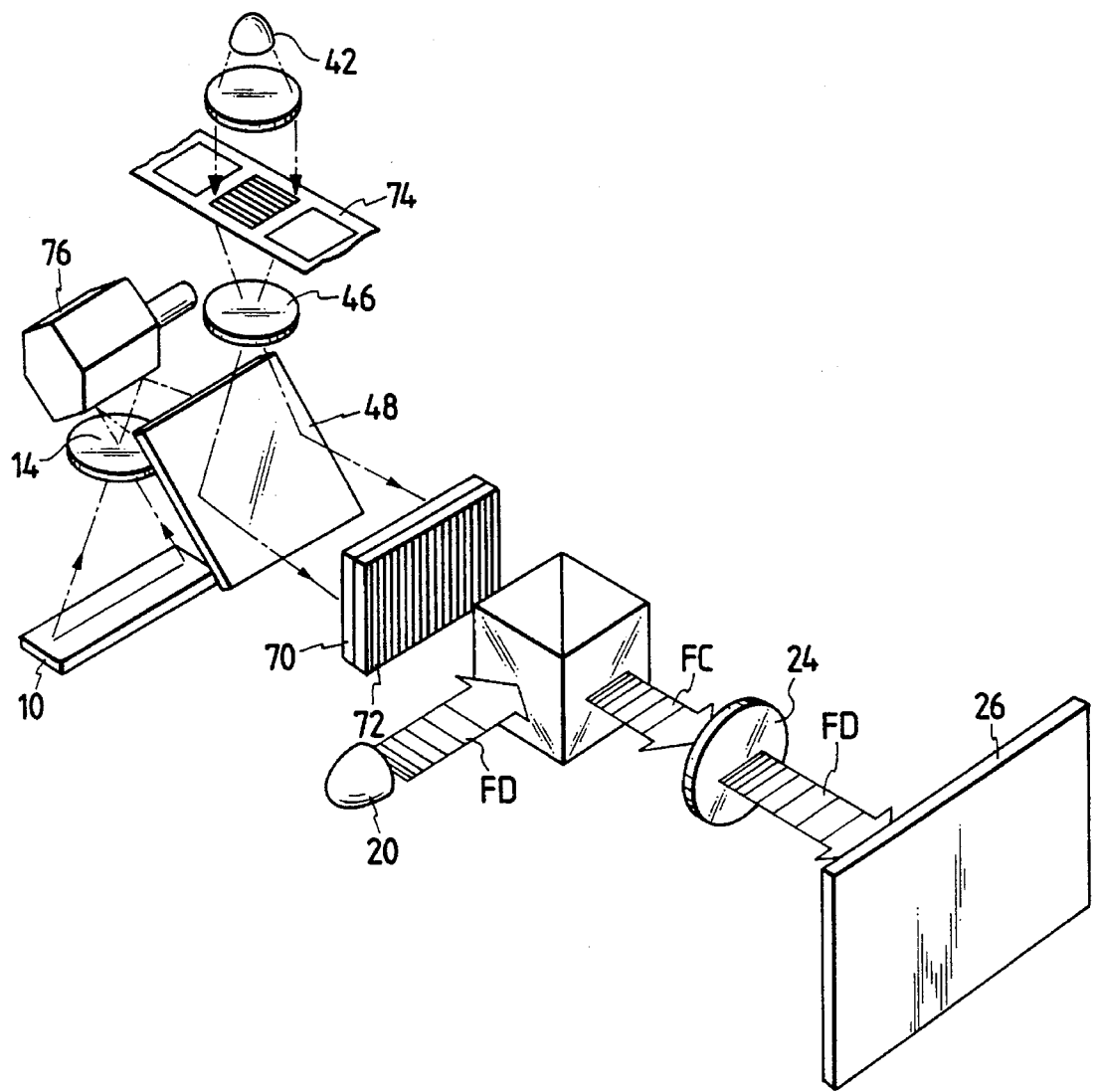
FIG. 24 is a diagrammatical perspective view showing a display unit according to a fifteenth embodiment of this invention.

The display unit shown in FIG. 24 includes a light-to-light conversion element 70 and a color separation filter 72 associated with the light-to-light conversion element 70. The color separation filter 72 is composed of a row of numerous groups of fine stripe-like color filter elements, each color filter element group being composed of red (R), green (G) and blue (B) filter elements. An information recording medium 74 contains recorded imaged of separate primary colors R, G, B corresponding in color to the R, G, B filter elements of the color separation filter 72.

Image information read out from the information recording medium 74 by means of output light from the light source 42 impinges on the semi-transparent mirror 48 and is reflected by the latter in a direction toward the light-to-light conversion element 70. Image information incident to the light-to-light conversion element 70 is recorded by the light-to-light conversion element 70 in such a manner that images of separate colors R, G, B correspond in position to the corresponding color filter elements of the color separation filter 72.

Reading light is projected from the light source 20 onto the light-to-light conversion element 70. In this instance, a beam of reading light is separated by the color separation filter 72 into three beams of light of different primary colors R, G, B before it reaches the light-modulation layer of the light-to-light conversion element 70. Thus, R, G and B beams of reading light are modulated in equivalent to the corresponding color images R, G, B and subsequently reflected back to the screen 26.

On the other hand, to the light-emitting element array 10 a time sequential signal corresponding to the arrangement of R, G, B filter elements of the color separation filter 72 is inputted, so that the light-emitting element array 10 is driven to emit beams of light corresponding to the arrangement of the R, G, B filter elements. The light beams are deflected by a polygon mirror 76 to scan the light-to-light conversion element 70. Subsequent operation is performed in the same manner as done with respect to the image on the information recording medium 74.

According to this embodiment, a color separation prism is no longer needed and hence the overall size of the display unit can be reduced.

Figure 25:
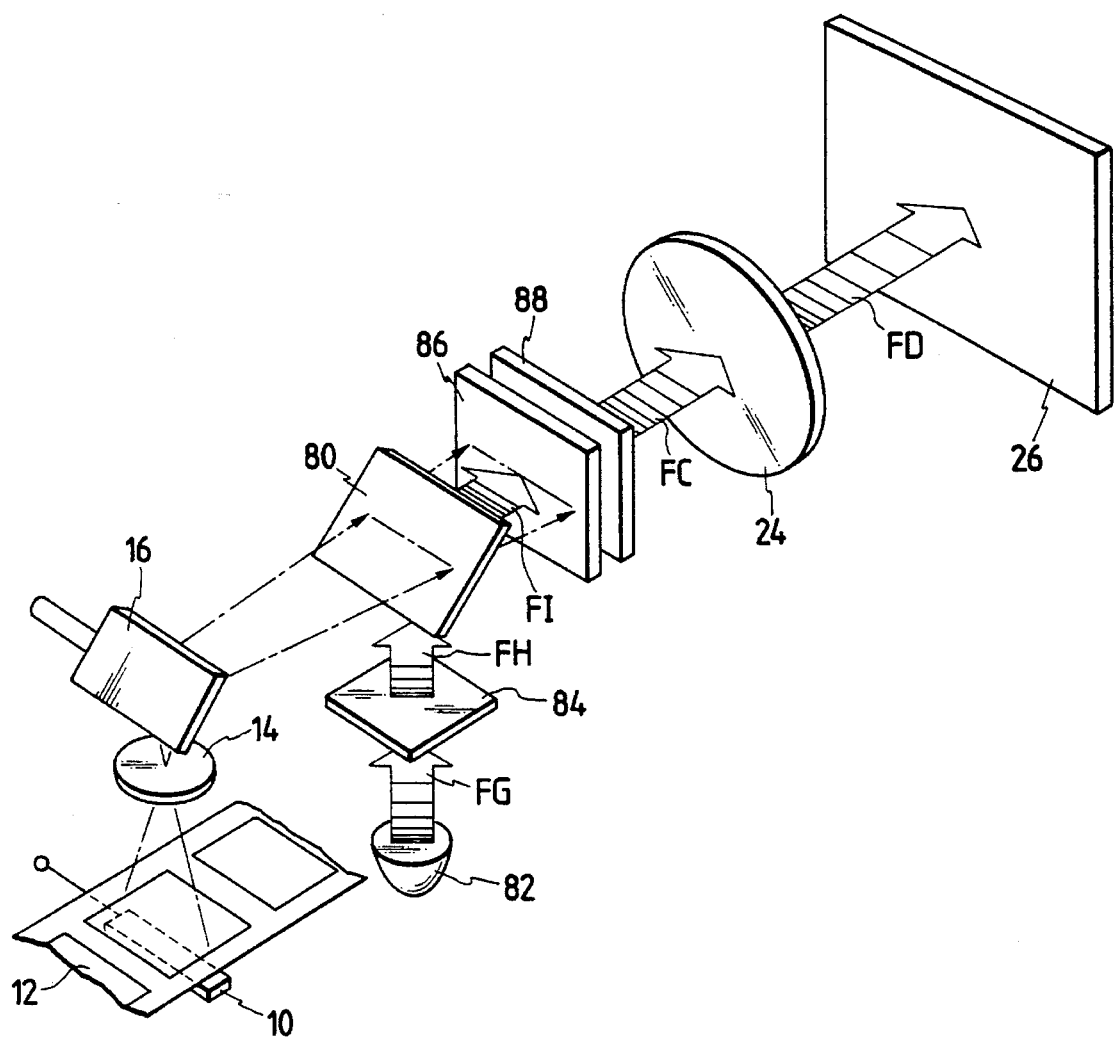
FIG. 25 is a view similar to FIG. 24 but showing a display unit according to a sixteenth embodiment.

The display unit shown in FIG. 25 differs from the display units of the foregoing embodiments in that the light-to-light conversion element is of the transparent type rather than the reflection type.

The display unit includes a beam splitter 80 disposed on an output side of the deflecting mirror 16. A light source 82 directs reading light onto the beam splitter 80 via a polarizer 84 as indicated by the arrows FG, FH. A transparent type light-to-light conversion element 86 is disposed on the output side of the beam splitter 80 and an analyzer 88 is disposed on the output side of the light-to-light conversion element 86.

The beam splitter 80 is a dichroic mirror when writing light and the reading light are distinguished from one another based on the difference in wavelength. When the writing light and reading light are distinguished depending on the difference in plane of polarization, then the beam splitter 80 is a polarized beam splitter.

The display unit of the foregoing construction operates as follows. Image information on the information recording medium 12 is read out in the same manner as done in the embodiment shown in FIG. 17. Writing light advances through the beam splitter 80 and impinges on the light-to-light conversion element 86.

To read out image information, reading light is applied from the light source 82 in the direction as indicated by the arrow FG. The reading light is subjected to a predetermined polarization performed by the polarizer 84 before it reaches the beam splitter 80. The polarized reading light is reflected by the beam splitter 80 and then moves into the light-to-light conversion element 86 where it is modulated. The modulated reading light advances to the analyzer 88. The analyzer 88 corresponds in function to the polarizer 84 so that only the reading light is permitted to pass through the analyzer 88. Subsequent operation is performed in the same manner as done in the foregoing embodiments and hence a further description is omitted.

The reflection type light-to-light conversion element incorporated in the display units shown in FIGS. 18, 19, 24 may be replaced with the transparent type light-to-light conversion element described above. In this instance, however, a reading light source and means for combining writing light and reading light must be disposed on the writing light input side of the light-to-light conversion element.

In the embodiments shown in FIGS. 17 through 25, the time sequential signal is applied to the light-emitting element array. The light-emitting element array may be substituted by a combination of a suitable light source and a shutter array such as liquid crystal. In the latter case, opening and closing operation of the shutter array takes place under the control of the time sequential signal. When the information recording medium is to be lighted, the shutter array is placed into a fully opened condition. In addition, the information recording medium may be provided in the form of a card, a disk, etc. other than those described above. Typical details of such information recording medium are set forth in Japanese Patent Application No. 2-100815 filed by the present assignee. The Japanese application also discloses methods of recording, retaining and reproducing information including color images, and typical examples of color separation filter.

FIGS. 26 through 43 show various forms of the display unit in which beams of light emitted from a plurality of light-emitting elements of a light-emitting element array are modulated in accordance with pieces of information to be written into a single planer light-to-light conversion element having a number of groups of separate areas of at least three different wavelength bands; the light beams are deflected and written in the light-to-light conversion element in which instance the light beams emitted from the light-emitting elements are controlled to be in register with the corresponding areas on the read-out side.

Figure 26:
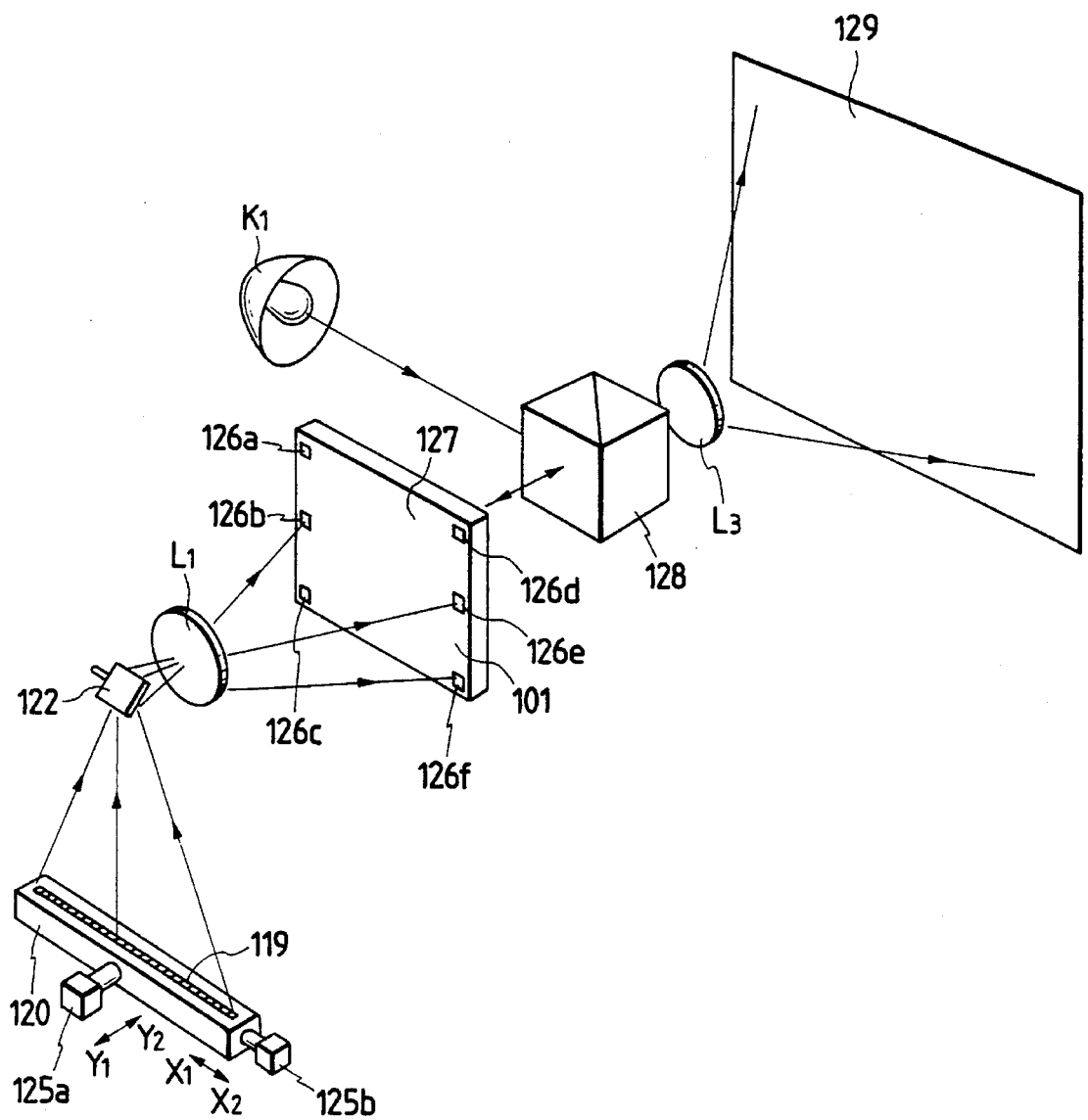
FIGS. 26 through 29 are diagrammatical perspective views showing four different display units according to seventeenth to twentieth embodiments of this invention.

The display unit shown in FIG. 26 includes a light-to-light conversion element 101 having a writing surface 127. A plurality of photosensors (six in the illustrated embodiment) 126a–126f are disposed along opposite edges of the writing surface 127. A first position adjuster 125a is connected to a central portion of one side of an elongate light-emitting element array 120 for adjusting (or correcting) the position of the light-emitting element array 120 in a transverse direction thereof (Y-direction). A second position adjuster 125b is connected to one end of the elongate light-emitting element array 120 for adjusting (or correcting) the position of the light-emitting element array 120 in a longitudinal direction thereof (X-direction). Two endmost ones of a row of light-emitting elements 119 of the light-emitting element array 120 are adapted to emit beams of light which are in turn projected, as optical position control signals, over a pair of vertically aligned rows of photosensors 126a–126c and 126d–126f, respectively. The photosensors 126a–126f convert the optical position control signals into electric position control signals depending on the intensity of incident light. The electric position control signals are indicative of the alignment and focusing of light beams relative to the respective photosensors 126a–126f. The electric position control signals are fed back to the position adjusters 125a, 125b to correct registration between the light-emitting element array 120 and the light-to-light conversion element 101. With this position adjustment, information writing operation can be performed with accuracy.

The light-to-light conversion element 101 includes at least a photoconductive layer and a photo-modulation layer as described below in greater detail. The position adjusters 125a, 125b have a stepping motor, a piezoelectric element, etc. and are operative to finely adjust the position of the light-emitting element array 120 so as to correct the focal point on the writing surface 127 of the light-to-light conversion element 101. The position adjusters 125a, 125b may further be connected with an oscillating mirror 122, an image-forming lens L1, the light-to-light conversion element 101, or the combination thereof, for fine adjustment of the relative position between the light-emitting element array 120 and the light-to-light conversion element 101. The adjustment may be performed when the display unit is powered or alternatively throughout the information writing operation. In the latter case, the position control signals are superposed on information signals.

Figure 31A:
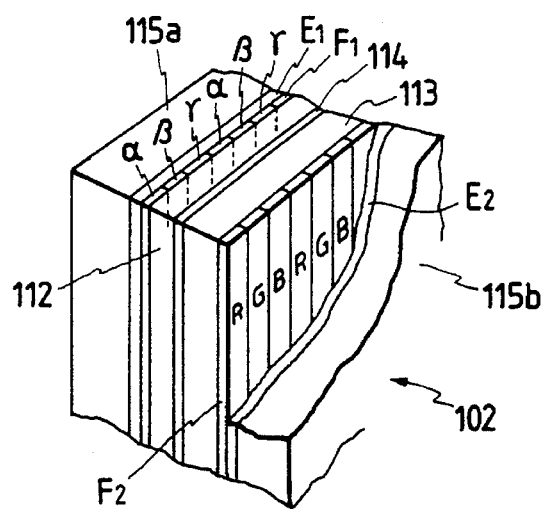
FIG. 31(a) through 31(c) are enlarged perspective views, with parts cutaway for clarity, of light-to-light conversion elements having interlaminated color separation filters.
Figure 31B:
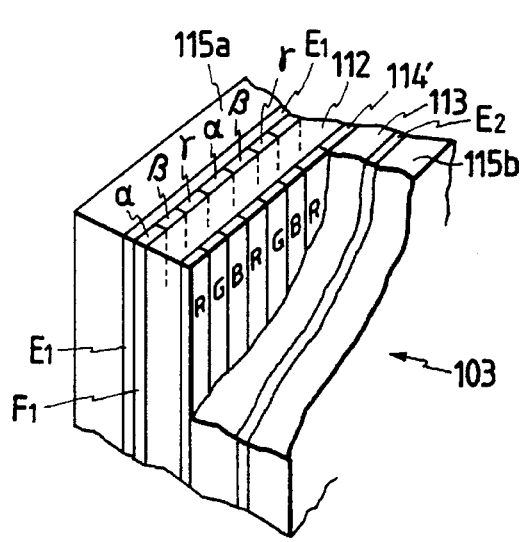
Figure 31C:
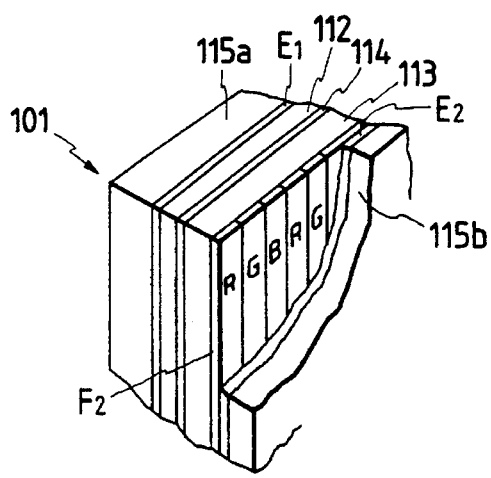

The light-to-light conversion element 101 includes, as shown in FIG. 31(c), a photoconductive layer 112, a photo-modulation layer 113, a dielectric mirror 114, first and second transparent substrates (support members) 115a, 115b, first and second transparent electrodes E1, E2 made from indium-tin oxide (ITO), for example, and a color separation filter F2 (hereinafter referred to as "color filter"). All the components of the light-to-light conversion element 101 are laminated together in the illustrated manner. More specifically, the color filter F2 is disposed between the photo-modulation layer 113 and the second electrode E2 so that the color filter F2 is disposed on the read-out side of the light-to-light conversion element 101. The dielectric mirror 114 may be omitted when the light-to-light conversion element 101 is of the transmission type. Furthermore, the color filter F2 may be replaced by a dielectric mirror 114 having reflection characteristics corresponding to the color separation characteristics of the color filter F2. The last-mentioned dielectric mirror 114 may be combined with the color filter F2 to constitute a light-to-light conversion element. In FIG. 26, 128 is a beam splitter, 129 is a screen, K1 is a light source for reading light, and L3 is a projection lens.

Figure 27:
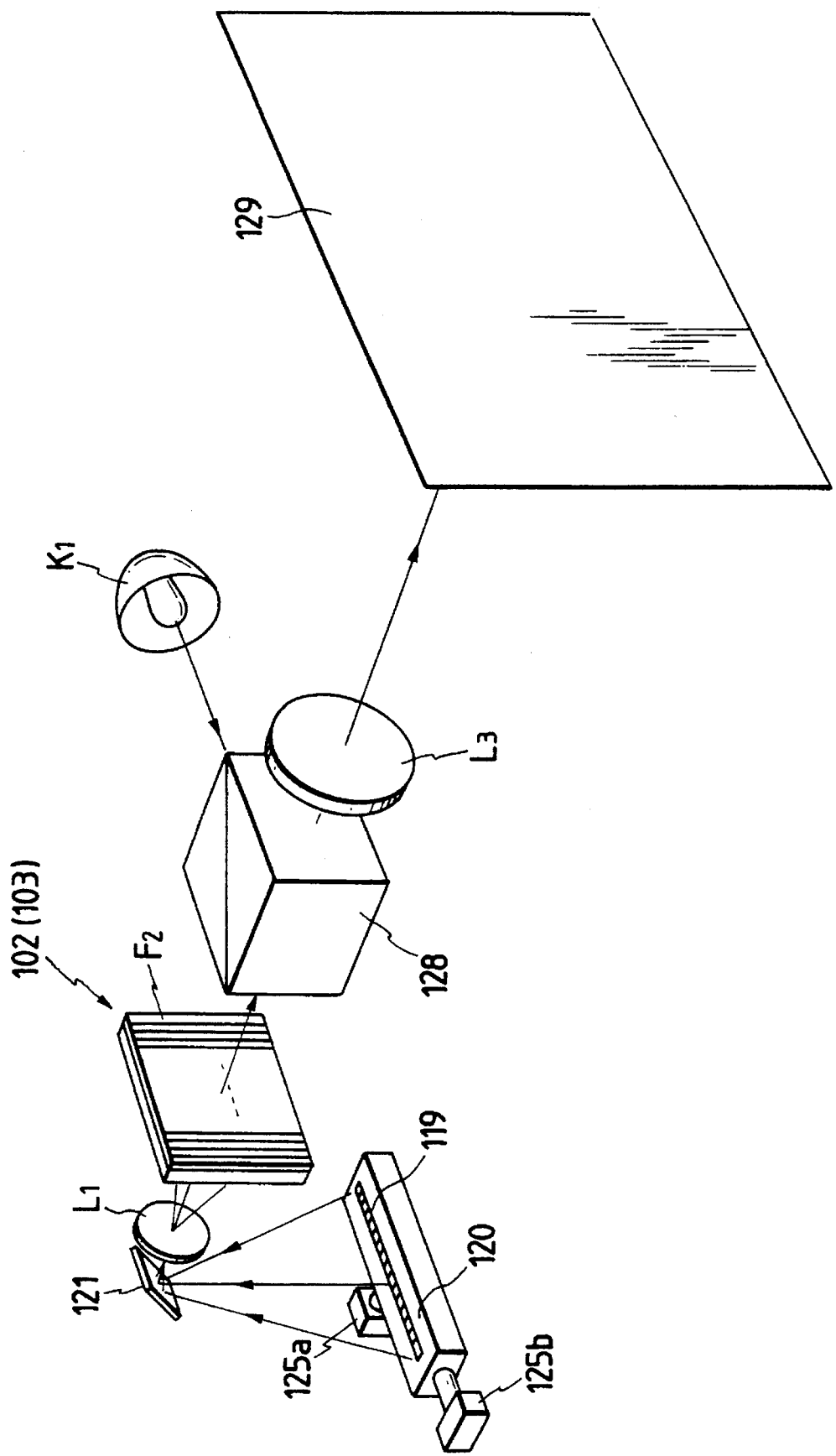

The display unit shown in FIG. 27 includes a deflector 121 for deflecting beams of light emitted from the light-emitting elements 119 of the light-emitting element array 120, and a light-to-light conversion element 102 having a first color filter F1 (FIG. 30) and a second color filter F2 laminated with the light-to-light conversion element 102. The color filters F1, F2 comprise a row of numerous fine vertical stripe-like filter elements which are preferably equal in number to the number of light-emitting elements 119. The beams of light emitted from the light-emitting elements 119 of the light-emitting element array 120 have respective wavelengths which are equivalent to the filtering characteristics of the corresponding filter elements of the first filter F1 disposed on the writing side of the light-to-light conversion element 102. After being deflected by the deflector 121, the light beams are written into the light-to-light conversion element 102. The information (image) reading operation is performed in the same manner as done in the embodiment shown in FIG. 26 and hence a further description can be omitted.

Figure 30:
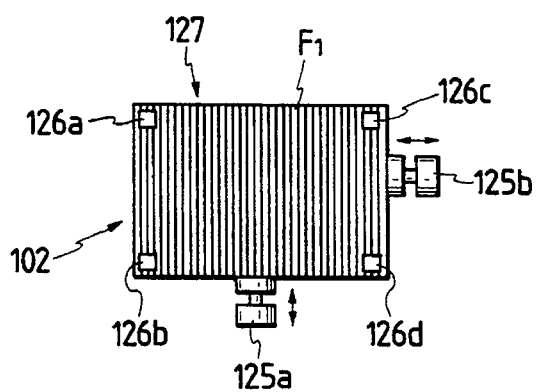
FIG. 30 is a plan view of a light-to-light conversion element and a position adjustor assembly associated therewith.

As shown in FIG. 30, a plurality of photosensors (four in the illustrated embodiment) 126a–126d are disposed on the respective corners of a writing surface 127 of the light-to-light conversion element 102 for fine adjustment of the relative position between the light-emitting element array 120 and the light-to-light conversion element 102 to insure an accurate writing operation. The positional adjustment may be performed by properly driving first and second position adjusters 125a, 125b connected to two adjacent sides of the light-to-light conversion element 102, as shown in FIG. 30.

The light-to-light conversion element 102 includes, as shown in FIG. 31(*a*), a photoconductive layer 112, a photo-modulation layer 113, a dielectric mirror 114 (which may be omitted when the light-to-light conversion element 102 is of the transparent type), first and second transparent substrates 115a, 115b, first and second transparent electrodes E1, E2 and the first and second color filters F1, F2 that are laminated in the illustrated manner. The color filter F2 and the dielectric mirror 114 may be replaced with a dielectric mirror 114' shown in FIG. 31(*b*). The dielectric mirror 114' has reflection characteristics corresponding to the color separation pattern (arrangement of the filter elements) of the color filter F2 and constitutes a part of the light-to-light conversion element 103. The dielectric mirror 114' may be used in combination with the color filters F1, F2 of the light-to-light conversion element 102.

The color filter F1 on the writing side has a wavelength which is determined with due consideration of the light emission characteristics of the light-emitting elements 119 and the sensitivity of the photoconductive elements constituting the color filter F1. Even when the second color filter F2 on the read-out side is of the three primary color type as shown in FIG. 31(*a*), the respective photoconductive elements of the first color filter F1 on the writing side may have different wavelength bands α, β, τ. The filter elements of the first color filter F1 and the filter elements of the second color filter F2 are arranged in pairs. The photo-modulation layer 15 may be a twisted nematic (TN) liquid crystal, a ferroelectric crystal, a polymer-liquid crystal composite film, an electro-optical crystal, lead lanthanum zirconate titanate (PLZT), etc. and is able to utilize effects of double refraction, rotary polarization of light and scattering of light.

Figure 33:
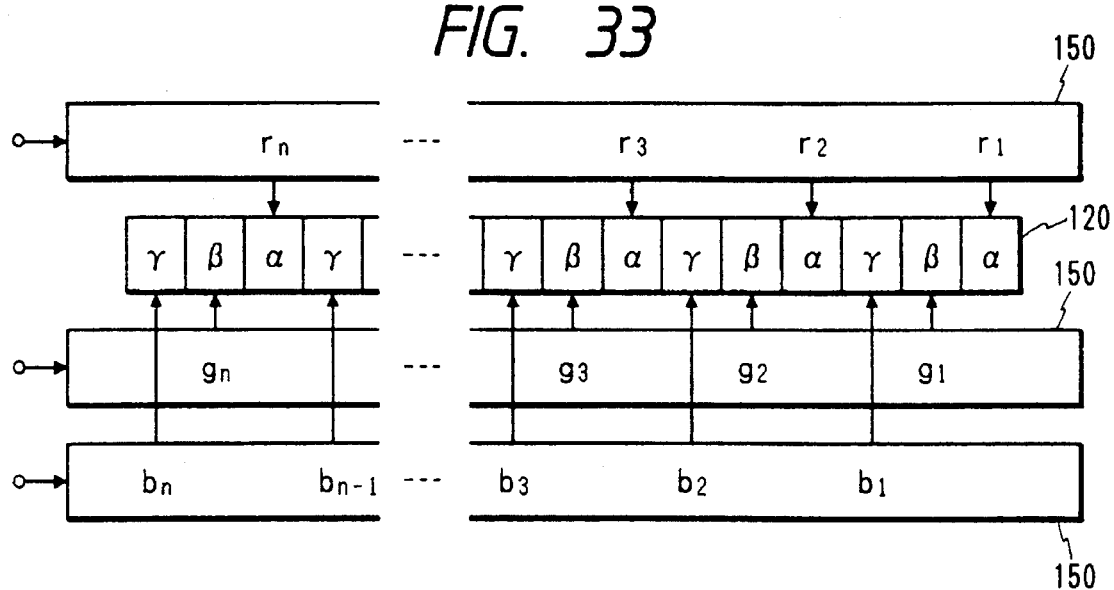
FIG. 33 is a diagrammatical view illustrative of the manner in which each picture element of a light-emitting element is driven.
Figure 34:
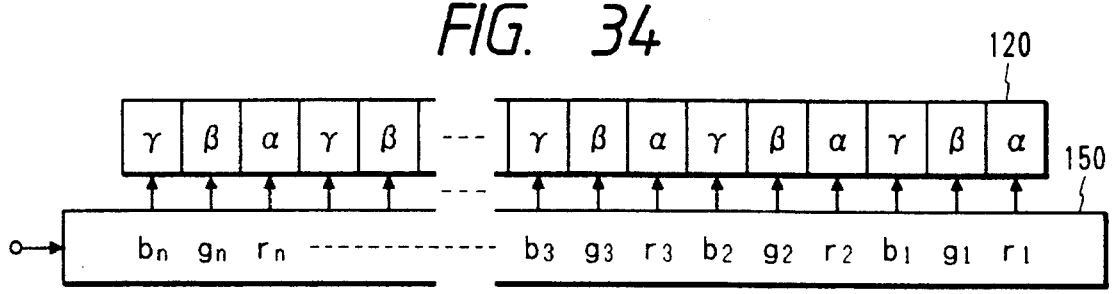
FIG. 34 is a view similar to FIG. 33 but showing another manner of driving the picture element.

The wavelength band separation to cope with the color display is realized in the form of an area separation of the read-out side made in accordance with a predetermined manner. In practice, the area separation is performed by providing a color filter F2 on the read-out side of the light-to-light conversion element 102, or by matching the reflective characteristics of the dielectric mirror 114' (FIG. 31(*b*)) with the color separation pattern. Typical examples of separation of the color filter F (F1, F2 and F3) are shown in FIGS. 32(*a*) and 32(*b*). When the color filter F is separated into a row of groups of vertical stripe-like filter elements R, G, B extending in a direction parallel to the direction of scanning of the beams of writing light indicated by the arrow in FIG. 32(*a*), the individual light-emitting elements of the light-emitting element array 120 are matched in position with the corresponding filter elements R, G, B, as shown in FIG. 33. A serial input signal for one scanning line given for each color is converted by a corresponding serial-parallel converter 150 into a parallel output signal which in turn is supplied to the light-emitting element array 120 for parallel excitation of the light-emitting elements, as shown in FIG. 33. Alternatively, as shown in FIG. 34, a dot sequential input signal for one scanning line is converted by a serial-parallel converter 150 into a parallel output signal which in turn is supplied to the light-emitting element array 120 to parallel excite the light-emitting elements. When the color filter F is separated into a row of groups of horizontal stripe-like filter elements R, G, B extending in a direction perpendicular to the scanning direction of the writing light beams, as shown in FIG. 32(*b*), a line sequential input signal is used to drive the light-emitting elements of the light-emitting element array 120. In this instance, it is possible to use a shift register for serial-to-parallel conversion of the input signal.

Each individual picture element is subjected to a modulation process which is performed in such a manner that the intensity of light emitted from one light-emitting element, the duration of light emission of the light-emitting element, or the cycle of emission of the light-emitting element is modulated in accordance with information given to the corresponding picture element. It is preferable that the pitch of stripe-like filter elements of the color filter F is sufficiently smaller than the spot size of a light beam of each wavelength converged on the color filter F. This smaller stripe pitch is particularly effective to minimize generation of registration error or color shading when the optical system on the writing side involves misalignment or distortion.

Figure 35:
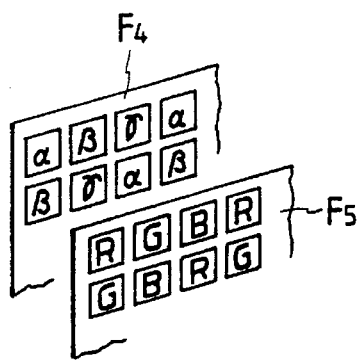
FIG. 35 is an enlarged exploded perspective view of a portion of another color separation filter.
Figure 36A:
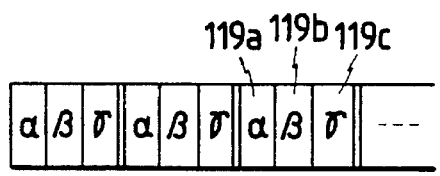
FIGS. 36a and 36b are diagrammatical views illustrative of two different arrangements of light-emitting elements.
Figure 36B:
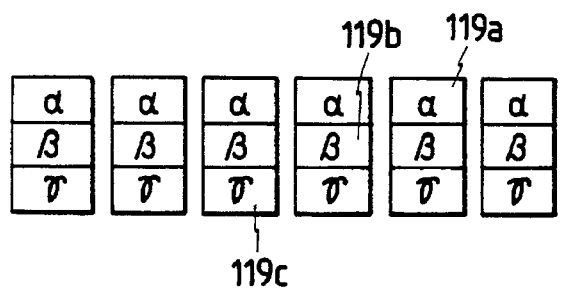

When the color filter comprises an island-like color filter F4 or F5 having a row of groups of island-like filter elements α, β and τ, or R, E, or B, as shown in FIG. 35, corresponding signals are inputted successively for writing pieces of image information. The light-emitting element array 120 includes a plurality of groups of at least three light-emitting elements (LEDs or laser diodes) 119a–119c capable of emitting light in different wavelength regions. The groups of three light-emitting elements 119a–119c are arranged in a straight horizontal row as shown in FIG. 36(*a*) or in vertical columns as shown in FIG. 36(*b*).

Figure 28:
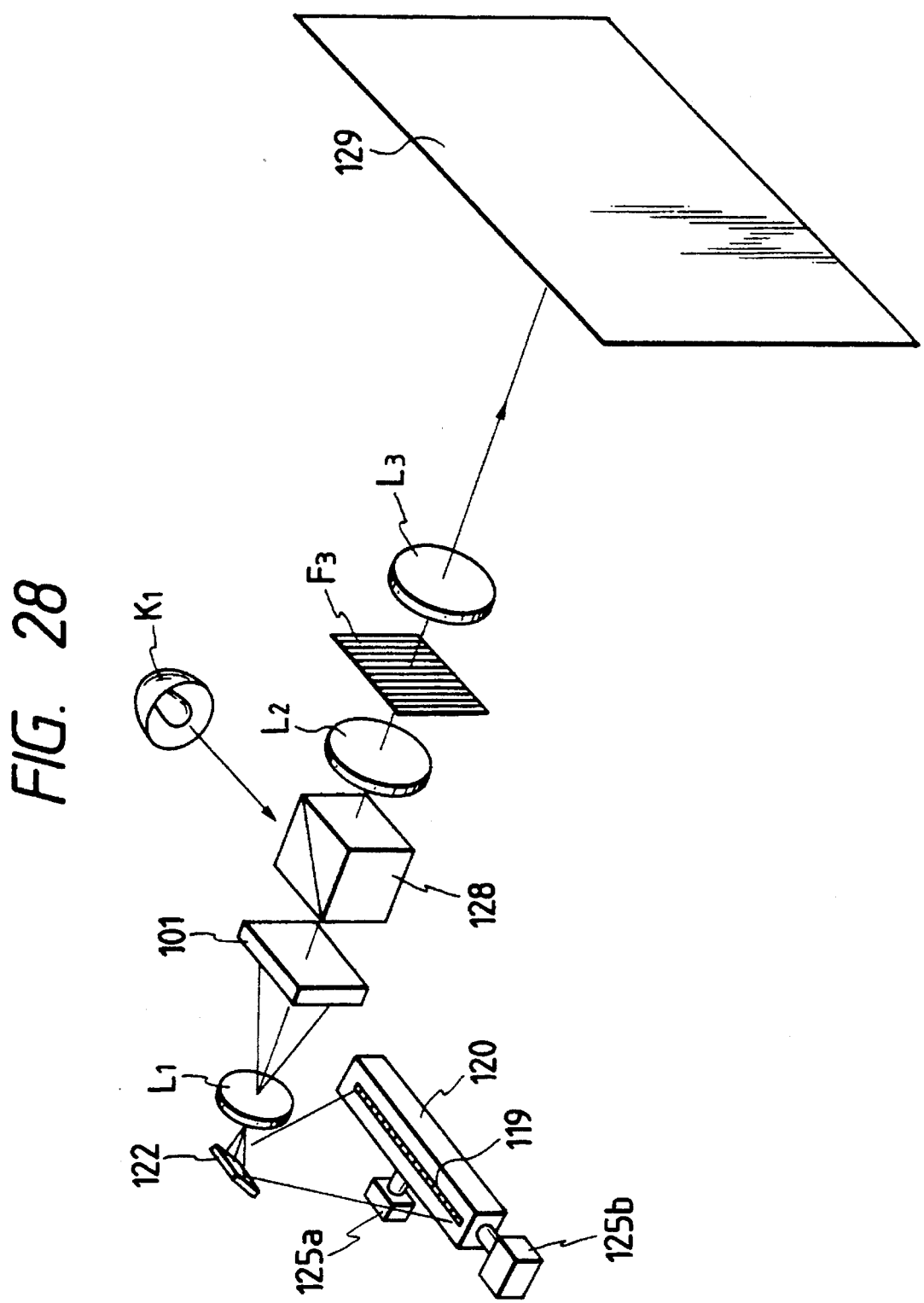
Figure 29:
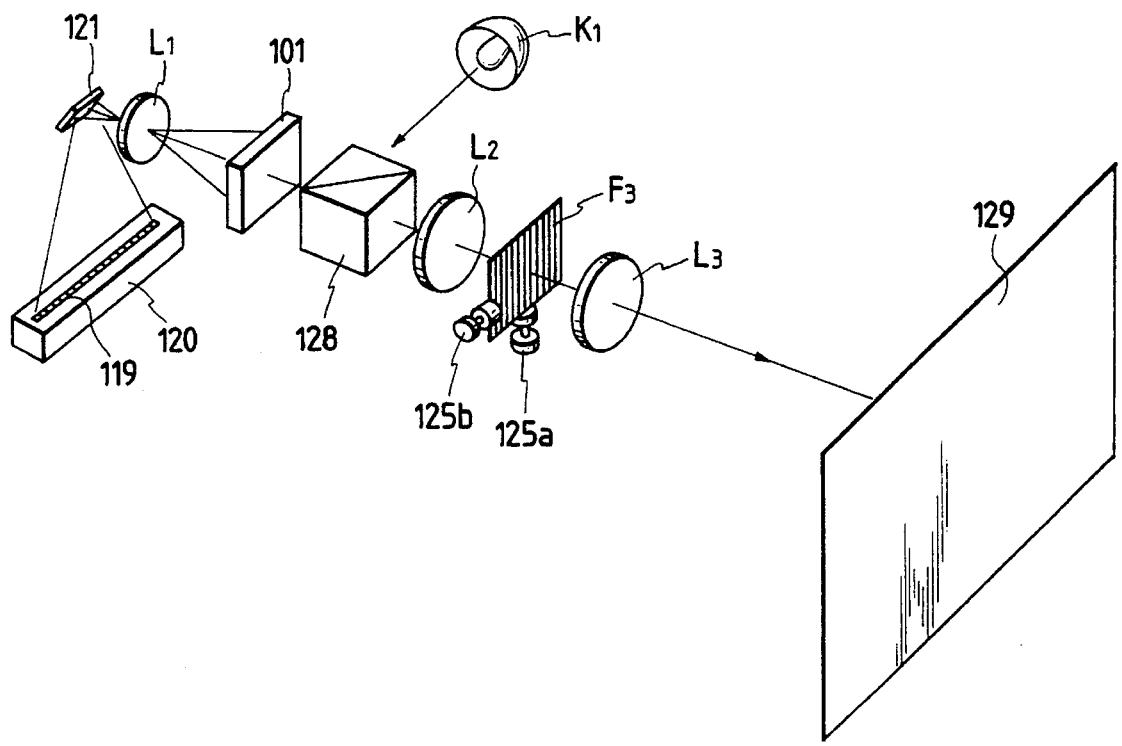

The display unit shown in FIG. 28 is similar to the display unit shown in FIG. 26 but differs therefrom in that a color filter F3 is disposed together with a condenser lens L2 in an optical path of reading light between a beam splitter 128 and a projection lens L3. This arrangement provides an increased degree of freedom of design of the color filter F3 and hence the color filter F3 can be manufactured easily at a low cost. This is a main advantage over the arrangement of the display unit shown in FIG. 27 in which the color filters F1, F2 united with the light-to-light conversion element 101 must be compact and hence requires a precision finish.

Reflected light, modulated by a light-to-light conversion element 101 in accordance with image information, passes through a beam splitter 128, then is projected by the lens L2 on the color filter F3 and finally is projected by the projection lens L3 onto a screen 129. In this embodiment, it is possible to arrange photosensors 126a–126d at corners of the color filter F3 in the manner as shown in FIG. 30, so that the operation of the position adjusters 125a, 125b can be controlled for fine adjustment of the position of the light-emitting element array 120. Thus, the reading operation can be performed accurately without registration error. As a further alternative, the position adjusters 125a, 125b may be associated with the color filter F3 to adjust the position of the same, as in the case of the embodiment shown in FIG. 29. In this instance, the photosensors 126a–126d are associated with one surface of the color filter F3 in the same manner as shown in FIG. 30 for detecting the amount of misalignment and sending respective output signals to the position adjusters 25a, 25b to finely adjust the position of the color filter F3.

Furthermore, it is possible to place the color filter F3 on the screen 129 in which instance the color filter F3 is observed by viewers.

Figure 38:
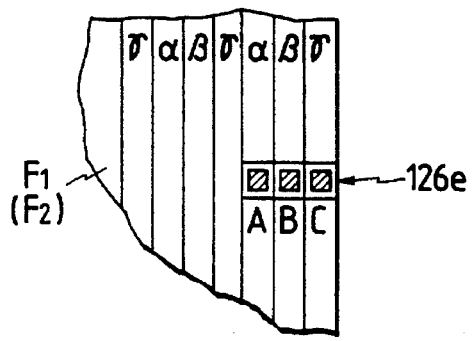
FIGS. 38 and 41 are diagrammatical views illustrative of the construction of photosensors.

A position adjustment operation of the display unit shown in FIG. 26 will be described below. In order to adjust the position of the light-emitting element array 120 in the x-direction (longitudinal direction of the array), the photosensor 126e is disposed adjacent to one edge of the writing surface of the light-to-light conversion element 101 in the same manner as shown in FIG. 38. The photosensor 126e is composed of three sensor elements A, B, C disposed in a position corresponding to the position of three endmost stripe-like filter elements α, β, τ of the color filter F1 on the read-out side.

Figure 39:
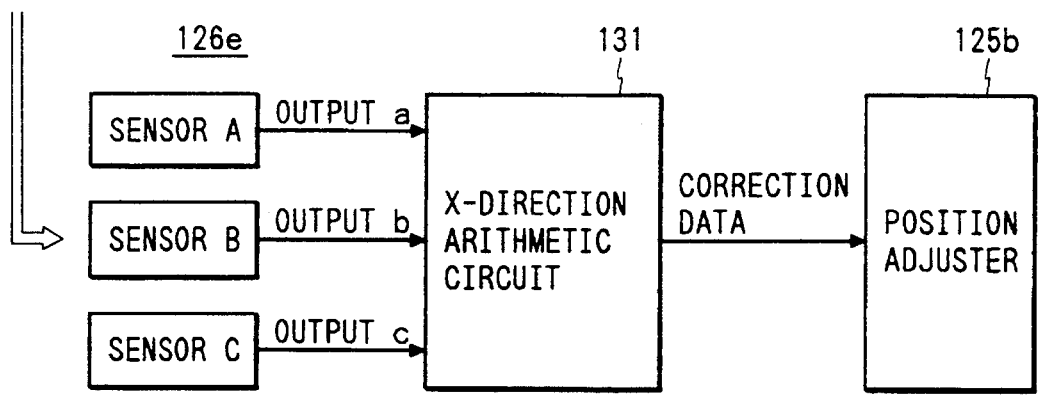
FIGS. 39 and 42 are block diagrams showing the general construction of a position adjustor assembly controller using the photosensors.
Figure 40:
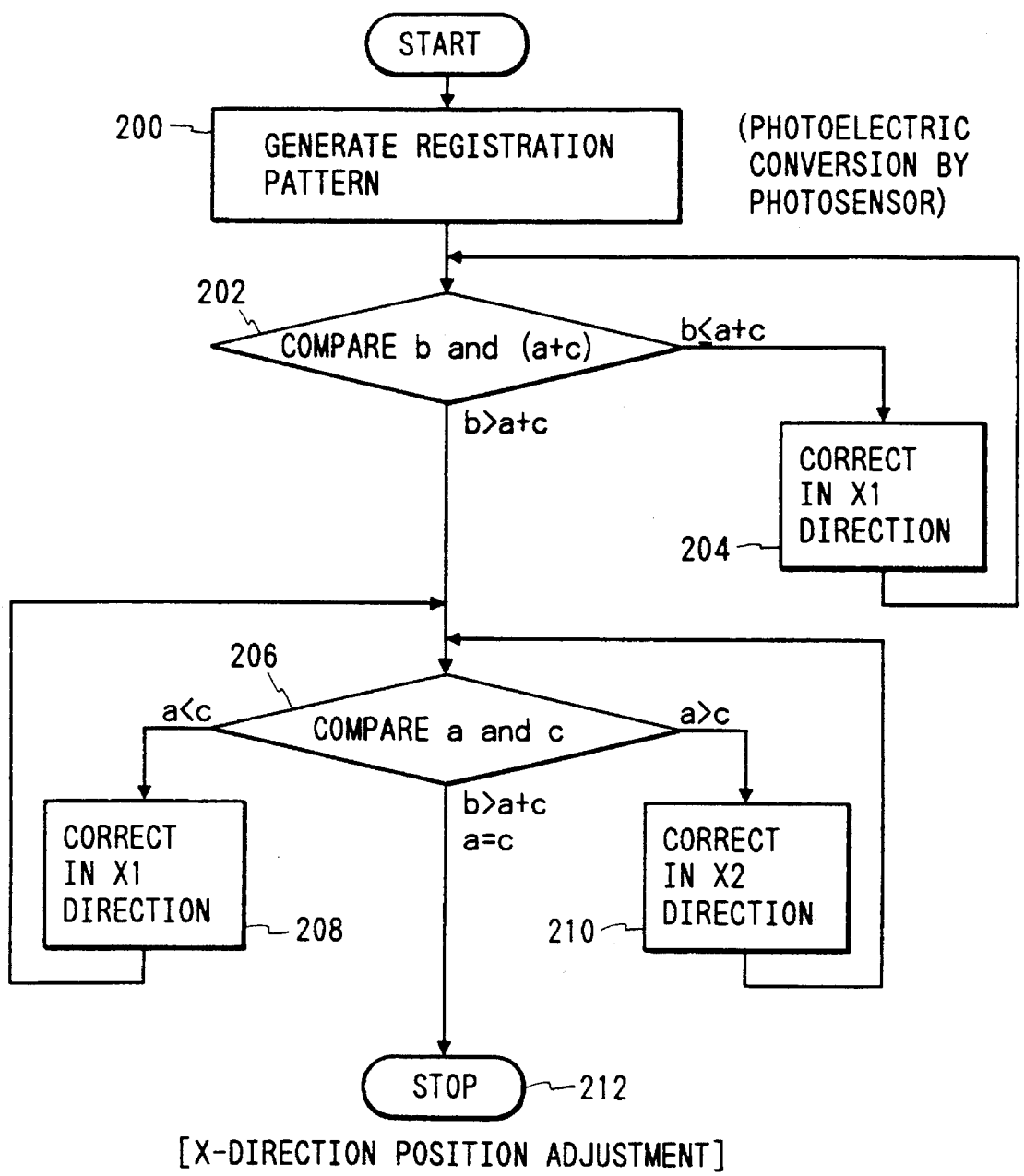

After a position adjustment operation in the x-direction is started, a registration pattern (correction pattern) is generated by emitting a beam of light from one of the light-emitting elements corresponding in position to the G (green) filter element on the read-out side (step 200) in FIG. 40. When exposed to the light beam, the sensor elements A, B, C produce sensor outputs a, b, c and deliver them into an x-direction arithmetic circuit 131, as shown in FIG. 39. The arithmetic circuit 131 calculates a correction data signal and issues it to the position adjuster 125b. In calculation of the correction data signal, the sensor output b is compared with a sum of the sensor outputs a and c (step 202 in FIG. 40). If $b \leq a+c$, then the position adjuster 125b is driven to move the light-emitting element array 120 in the x1 direction shown in FIG. 26 (step 204 in FIG. 40). On the contrary, if $b>a+c$, a further comparison is made between the sensor output a and the sensor output c (step 206 in FIG. 40). In this instance, if $a<c$, the position adjuster 125b is driven to move the light-emitting element array 120 in the X2 direction (step 208 in FIG. 40). Conversely, if $a>c$, then the position adjuster 125b is driven to move the light-emitting element array 120 in the X1 direction (step 210 in FIG. 40). Adjustment continues until the condition of $b>a+c$ and $a=c$ is reached, whereupon the position adjustment operation is stopped (step 212 in FIG. 40). Thus, the light-emitting element array 120 is in register with the color filter F1.

Figure 41:
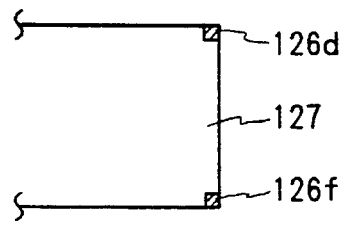
Figure 42:
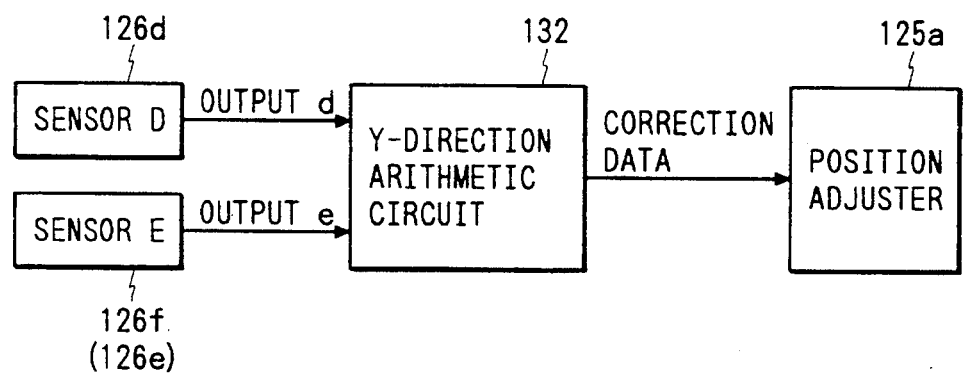

The position adjustment in the Y-direction (transverse direction of the array 120) is carried out in the manner as shown in the flowchart of FIG. 43. Photosensors 126d, 126f are disposed at the corners on one side of the writing surface 127 of the light-to-light conversion element, as shown in FIG. 41. Outputs d and e from the respective photosensors 126d (sensor D) and 126f (sensor E) are inputted in a Y-direction arithmetic circuit 132, as shown in FIG. 42. The arithmetic circuit 132 compares the sensor outputs d and e and calculates a correction data signal which in turn is supplied to the position adjuster 125a. In this instance, if $d<e$, the position adjuster 125a is driven to move the light-emitting element array 120 in the Y1 direction. If $d>e$, then the position adjuster 125a is driven to move the light-emitting element array 120 in the Y2 direction. The adjustment continues until a condition $d=e$ is reached.

Figure 37:
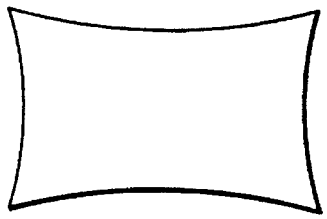
FIG. 37 is a view illustrative of a distorting aberration occurring with an image formed on a photoconductive layer of the light-to-light conversion element.

When an image is formed on an image-forming surface of the photoconductive layer of the light-to-light conversion element 101, an optical aberration such as distortion may occur, as shown in FIG. 37. Due to this aberration, imaging on the color filter is performed out of alignment with the color separation pattern of the color filter F3. As a consequence, there is produced a color shading appearing on a display image. It is therefore desirable that the color separation pattern of the color filter F3 should previously be corrected in view of the aberration to overcome the problem of color shading.

Figure 32A:
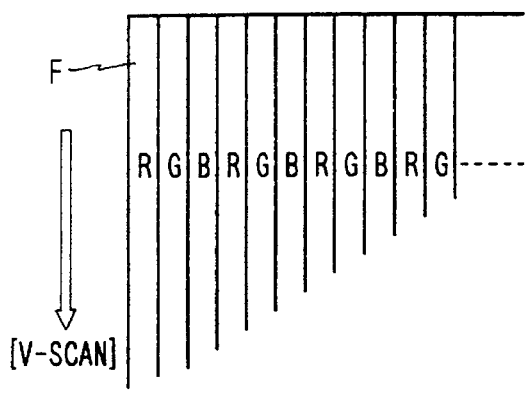
FIGS. 32(a)–(b) are a plan view showing the arrangement of a color separation filter.
Figure 32B:
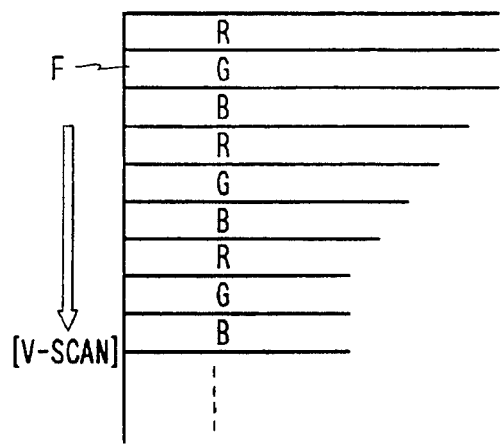

In case of the color filter F3 having verticalstripes (vertically arranged filter elements), as shown in FIG. 32(a), the foregoing aberration can be cancelled out by controlling the manner of emission of the light-emitting elements to cope with the aberration. On the other hand, if the color filter F3 is of the horizontally striped type as shown in FIG. 32(b), the oscillating mirror 122 is controlled to vary the speed of deflection of light beams so as to cancel out the aberration. In addition, it is possible to accommodate the aberration of FIG. 37 when the color filter F3 is manufactured.

In the illustrated embodiments, information (image) recorded on the light-to-light conversion element is read out and projected on the screen. It is possible according to the present invention to utilize the light-to-light conversion element as a display panel which is directly observed by viewers.

The embodiments shown in FIGS. 26–43 have various advantages described below. Due to the absence of the color separation and composition prism, the projection optical system is simple in construction and compact in size. In addition, the image writing system is composed of only one deflector and hence is simple in construction. The time sequential signal can be used to write information into the light-to-light conversion element. The individual picture elements are so controlled as to be written in compliance with the color separation pattern of the color filter so that registration error or color shading can be reduced to a minimum. The deflected beams of writing light may not be in accurate registration with the corresponding stripe-like filter elements of the color filter. The color filters on the writing side and the color filter on the read-out side are not required to have the same wavelength. They need respective color separation patterns corresponding to one another. The color separation pattern of the writing side color filter can be determined in view of the emission characteristics and sensitivity of the light-emitting elements in addition to the color requirement R, G, B. Furthermore, since the linearly arranged light-emitting elements of the light-emitting element array are exited in the linear sequential order and hence a relatively long writing time period is available, so that an intensive light source is no longer needed. Parallel excitation or driving of the light-emitting elements of the light-emitting element array is possible. By using a color filter which has previously modified or distorted in its color separation pattern to cancel out a distortion which may occur on the writing side, a color shading can be minimized or substantially eliminated.

Obviously, various minor changes and modifications of the present invention are possible in the light of the above teaching. It is therefore to be understood that within the scope of the appended claims the invention may be practiced otherwise than as specifically described.

What is claimed is:

1. A display unit, comprising:
   (a) a light-emitting element array composed of linearly arranged light-emitting elements of a number equal to that of picture elements forming a single straight line of an image to be displayed, said light-emitting elements being drivable to emit beams of light for predetermined periods of time at respective emission intensities modified simultaneously in accordance with pieces of information allotted to the picture elements on the single straight line of the image to be displayed;

(b) means for deflecting the light beams emitted from said light-emitting elements, simultaneously in a direction perpendicular to a longitudinal direction of said light-emitting element array to form a two-dimensional light pattern;

(c) a light-to-light conversion element including two electrodes of opposite polarities, a photoconductive layer, a mirror layer, and a photo-modulation layer disposed between said electrodes, said photoconductive layer forming an image when irradiated by the two-dimensional light pattern from the deflected light beams;

(d) a light source;

(e) means for directing light from said light source to the photo-modulation layer of said light-to-light conversion element as reading light;

(f) a screen; and (g) focusing means for projecting the reading light which is modulated by the photo-modulation layer and reflected by the mirror layer according to the deflected light beams and focusing the reading light on said screen.

2. A display unit according to claim 1, further including means for driving said light-emitting elements individually at the same time, said driving means comprising a signal source for generating a time sequential signal containing the pieces of information of the said picture elements, and a serial-parallel converter connected between said signal source and said light-emitting elements for converting the time sequential signal to coincidental signals.

3. A display unit according to claim 1, further including means for concentrating the two-dimensional light pattern from the deflected light beams onto said photoconductive layer of said light-to-light conversion element.

4. A display unit according to claim 3, wherein said imaging means comprises a zoom lens capable of continuously varying the magnification of the image formed in said photoconductive layer.

5. A display unit according to claim 1, wherein said light-emitting element array further includes a microlens array overlying said linearly arranged light-emitting elements.

6. A display unit, comprising:

(a) a plurality of light-emitting element arrays, each array being composed of linearly arranged light-emitting elements of a number equal to that of corresponding picture elements forming a single straight lane of an image to be displayed, said light-emitting element arrays being disposed side by side with the light-emitting elements of the respective rays laterally aligned with each other;

(b) means for driving said light-emitting elements of each said light-emitting element arrays to emit beams of light simultaneously for predetermined periods of time in accordance with one of a plurality of different rows having pieces of picture element information allotted no the corresponding picture elements;

(c) means for deflecting the light beams emitted from each of said light-emitting element arrays, simultaneously in a direction perpendicular to a longitudinal direction of said light-emitting element arrays to form a two-dimensional light pattern;

(d) means for supplying said plurality of different rows having pieces of picture element information to said light-emitting element arrays while shifting the rows having pieces of picture element information successively in a direction opposite to the direction of movement of the light beams resulting from deflection of the light beams by said deflecting means, said means for supplying operating in synchronism with the deflection of the light beams by said deflecting means and at intervals of said predetermined periods of time;

(e) a light-to-light conversion element including two electrodes of opposite polarities and a photoconductive layer and a photo-modulation layer disposed between said electrodes, said photoconductive layer forming an image when irradiated by the two-dimensional light pattern from deflected light beams;

(f) a screen;

(g) means for concentrating the two-dimensional pattern from the deflected light beams onto said photoconductive layer of said light-to-light conversion element to form an image; and (h) focusing means for projecting light from said image formed on said photoconductive layer according to the deflected light beams and for focusing the projected light on said screen.

7. A display unit according to claim 1, wherein said light-emitting elements are constituted by light emitting diodes.

* * * * *